(12) United States Patent
Sawada et al.

(10) Patent No.: US 12,159,656 B2
(45) Date of Patent: Dec. 3, 2024

(54) MAGNETIC RECORDING MEDIUM, MAGNETIC TAPE CARTRIDGE, AND MAGNETIC RECORDING AND REPRODUCING DEVICE

(71) Applicant: FUJIFILM Corporation, Tokyo (JP)

(72) Inventors: Junya Sawada, Minamiashigara (JP); Noriko Oyanagi, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/052,406

(22) Filed: Nov. 3, 2022

(65) Prior Publication Data

US 2023/0154491 A1  May 18, 2023

(30) Foreign Application Priority Data

Nov. 5, 2021  (JP) ................. 2021-181450

(51) Int. Cl.
| | |
|---|---|
| *G11B 5/708* | (2006.01) |
| *G11B 5/66* | (2006.01) |
| *G11B 5/735* | (2006.01) |
| *G11B 5/008* | (2006.01) |
| *G11B 23/107* | (2006.01) |

(52) U.S. Cl.
CPC ............ *G11B 5/676* (2021.05); *G11B 5/7085* (2013.01); *G11B 5/7356* (2019.05); *G11B 5/00813* (2013.01); *G11B 23/107* (2013.01)

(58) Field of Classification Search
CPC ... G11B 23/107; G11B 5/00813; G11B 5/676; G11B 5/7085; G11B 5/7356; G11B 5/78
See application file for complete search history.

(56) References Cited

U.S. PATENT DOCUMENTS

2007/0171573 A1   7/2007  Oyanagi et al.

FOREIGN PATENT DOCUMENTS

| JP | 2006-286074 A | 10/2006 |
| JP | 2007-026564 A | 2/2007 |

OTHER PUBLICATIONS

English Machine Translation: Koyama et al. (JP 10-330655) (Year: 1998).*
English Machine Translation: Kanazawa et al. (JP 2006/286074) (Year: 2006).*
English Machine Translation: Matsubaguchi (JP 2005-004910).*

* cited by examiner

*Primary Examiner* — Holly Rickman
*Assistant Examiner* — Linda N Chau
(74) *Attorney, Agent, or Firm* — Sughrue Mion, PLLC

(57) ABSTRACT

The magnetic recording medium includes a non-magnetic support; and a magnetic layer containing a ferromagnetic powder, in which the magnetic layer includes an abrasive, the abrasive is a carbide, an average primary particle diameter of the abrasive is 10 nm or more and 100 nm or less, and in an electron microscope image of a surface of the magnetic layer, assuming that a total area occupied by the abrasive is 100%, a ratio of an area occupied by the abrasive present in an aggregated state having a maximum Feret diameter of 0.2 µm or more is 50% or more.

15 Claims, 1 Drawing Sheet

MT

MAGNETIC RECORDING MEDIUM, MAGNETIC TAPE CARTRIDGE, AND MAGNETIC RECORDING AND REPRODUCING DEVICE

CROSS-REFERENCE TO RELATED APPLICATIONS

This application claims priority under 35 U.S.C 119 to Japanese Patent Application No. 2021-181450 filed on Nov. 5, 2021. The above application is hereby expressly incorporated by reference, in its entirety, into the present application.

BACKGROUND OF THE INVENTION

1. Field of the Invention

The present invention relates to a magnetic recording medium, a magnetic tape cartridge, and a magnetic recording and reproducing device.

2. Description of the Related Art

A magnetic recording medium has been widely used as a recording medium for recording various pieces of data (see, for example, JP2007-26564A and JP2006-286074A).

SUMMARY OF THE INVENTION

Recording of data on a magnetic recording medium and reproducing of recorded data are performed by, for example, causing a magnetic layer surface of the magnetic recording medium and a magnetic head (hereinafter, simply referred to as a "head") to come into contact with each other to be slid on each other. A phenomenon in which a distance between the magnetic layer surface and the head increases is generally called spacing loss, and the electromagnetic conversion characteristics tend to deteriorate as the distance increases.

There are two causes of the spacing loss as follows.

A first cause is shavings generated in a case where the magnetic recording medium (for example, the magnetic layer) is scraped because of sliding on the head. Such shavings are generally referred to as debris. In a case where debris adheres to the head, the distance between the magnetic layer surface and the head increases.

A second cause is wear of the head due to sliding on the magnetic layer surface. In a case where the head is worn, the distance between the magnetic layer surface and the head increases in a worn portion.

As a countermeasure against the first cause, the magnetic layer surface is provided with a function of removing debris from the head. For this reason, in the related art, the magnetic layer has been made to contain an abrasive (see, for example, JP2007-26564A and JP2006-286074A).

However, in a case where the head is significantly worn by the abrasive during sliding between the magnetic layer surface and the head, deterioration in electromagnetic conversion characteristics due to spacing loss is more likely to occur.

In view of the above, it is desired that the magnetic recording medium can achieve both the following two requirements.

First, it should be excellent in durability. This is because, in a case where the magnetic recording medium is excellent in durability, debris is less likely to occur during sliding on the head.

Second, it should be difficult to wear the head even in a case where the magnetic recording medium slides on the head (that is, reduction in head wear).

An object of one aspect of the present invention is to provide a magnetic recording medium capable of exhibiting excellent durability and reducing head wear.

One aspect of the present invention relates to a magnetic recording medium comprising: a non-magnetic support; and a magnetic layer containing a ferromagnetic powder, in which the magnetic layer includes an abrasive, the abrasive is a carbide, an average primary particle diameter of the abrasive is 10 nm or more and 100 nm or less, and in an electron microscope image of a surface of the magnetic layer, assuming that a total area occupied by the abrasive is 100%, a ratio (hereinafter, also referred to as an "abrasive aggregate ratio") of an area occupied the abrasive present in an aggregated state having a maximum Feret diameter of 0.2 µm or more is 50% or more.

In one embodiment, the magnetic recording medium may further comprise one or more layers of a non-magnetic layer containing a non-magnetic powder between the non-magnetic support and the magnetic layer.

In one embodiment, in the magnetic recording medium, in a case where a total number of layers of the non-magnetic layer is one, a thickness of the non-magnetic layer of one layer may be less than 1.0 µm.

In one embodiment, in the magnetic recording medium, in a case where the total number of layers of the non-magnetic layer is two or more, a total thickness of the non-magnetic layer of two or more layers may be less than 1.0 µm.

In one embodiment, the carbide may be one or more selected from the group consisting of titanium carbide, tungsten carbide, zirconium carbide, silicon carbide, boron carbide, and vanadium carbide.

In one embodiment, the ratio of the area occupied by the abrasive present in the aggregated state having the maximum Feret diameter of 0.2 µm or more may be 50% or more and 95% or less.

In one embodiment, the ratio of the area occupied by the abrasive present in the aggregated state having the maximum Feret diameter of 0.2 µm or more may be 60% or more and 95% or less.

In one embodiment, the ratio of the area occupied by the abrasive present in the aggregated state having the maximum Feret diameter of 0.2 µm or more may be 80% or more and 95% or less.

In one embodiment, the magnetic recording medium may further comprise a back coating layer containing a non-magnetic powder on a surface side of the non-magnetic support opposite to a surface side on which the magnetic layer is provided.

In one embodiment, the magnetic recording medium may be a magnetic tape.

Another aspect of the present invention relates to a magnetic tape cartridge comprising the magnetic tape.

Still another aspect of the present invention relates to a magnetic recording and reproducing device comprising the magnetic recording medium.

According to one aspect of the present invention, it is possible to provide a magnetic recording medium capable of exhibiting excellent durability and reducing head wear. In addition, according to one aspect of the present invention, it is possible to provide a magnetic tape cartridge and a magnetic recording and reproducing device including the magnetic recording medium.

DESCRIPTION OF THE PREFERRED EMBODIMENTS

Magnetic Recording Medium

Figure 1:
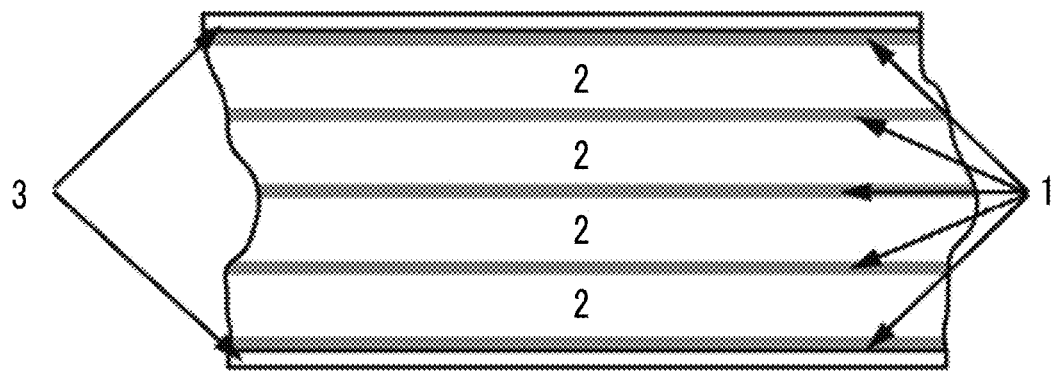
FIG. 1 shows an arrangement example of a data band and a servo band.

One aspect of the present invention relates to a magnetic recording medium including: a non-magnetic support; and a magnetic layer containing a ferromagnetic powder, in which the magnetic layer includes an abrasive, the abrasive is a carbide, an average primary particle diameter of the abrasive is 10 nm or more and 100 nm or less, and in an electron microscope image of a surface of the magnetic layer, assuming that a total area occupied by the abrasive is 100%, a ratio of an area occupied by the abrasive present in an aggregated state having a maximum Feret diameter of 0.2 μm or more is 50% or more.

The present inventor speculates as follows about the reason why the magnetic recording medium can exhibit excellent durability and can reduce head wear.

In the magnetic recording medium, the abrasive contained in the magnetic layer is a carbide (hereinafter also referred to as a "carbide abrasive"). The present inventor makes intensive studies on the carbide abrasive, and speculates that the presence of the carbide abrasive in the magnetic layer as an aggregate contributes to alleviation of an impact on a magnetic layer surface from a head during sliding between the magnetic layer surface and the head. In the present invention and the present specification, the term "magnetic layer surface" has the same meaning as a surface of the magnetic recording medium on a magnetic layer side. As a result of further intensive studies, the present inventor has found that the inclusion of the carbide abrasive present in such a state in a predetermined ratio or more in the magnetic layer leads to both excellent durability and reduction in head wear. The aggregate is aggregation of primary particles. The present inventor considers that it can be determined that the carbide abrasive is present in the magnetic layer as an aggregate which can contribute to alleviate the impact on the magnetic layer surface from the head by observing aggregation of the primary particles of the carbide abrasive having an average primary particle diameter of 10 nm or more and 100 nm or less in a state having a maximum Feret diameter of 0.2 μm or more. Then, the present inventor has newly found that a magnetic recording medium in which the carbide abrasive present as such aggregate is contained in an amount of 50% or more with respect to the entire carbide abrasive observed on the magnetic layer surface can exhibit excellent durability and reduce head wear. The present inventor speculates that, in the aggregate of the carbide abrasive, amorphous carbon contained as an impurity of the carbide particles is interposed between the primary particles constituting the aggregate, and the amorphous carbon between the particles is deformed during sliding between the magnetic layer surface and the head, so that the impact on the magnetic layer surface from the head can be alleviated. Note that the present invention is not limited to other speculation described in the present specification.

Carbide Abrasive

In the present invention and the present specification, the term "abrasive" refers to inorganic particles having a Mohs hardness of 6 or more. The inorganic particles are particles of inorganic substances.

The abrasive contained in the magnetic layer of the magnetic recording medium is a carbide. In the magnetic recording medium, only one or two or more kinds of carbides can be contained in the magnetic layer as an abrasive in any ratio. Examples of the carbide include titanium carbide, tungsten carbide, zirconium carbide, silicon carbide, boron carbide, and vanadium carbide. Regarding a composition formula thereof, titanium carbide can be represented by a composition formula TiC, tungsten carbide can be represented by a composition formula WC, zirconium carbide can be represented by a composition formula ZrC, silicon carbide can be represented by a composition formula SiC, and vanadium carbide can be represented by a composition formula VC. Boron carbide can be represented by a composition formula $B_4C$ or the like. The Mohs hardness of TiC, WC, ZrC, SiC, VC, and $B_4C$ is 9.5. The Mohs hardness of the carbide abrasive is 6 or more, preferably 7 or more, more preferably 8 or more, sill more preferably 9 or more, and still more preferably greater than 9. The Mohs hardness of the carbide abrasive is 10 or less, and preferably less than 10.

Average Primary Particle Diameter

The average primary particle diameter of the carbide abrasive contained in the magnetic layer of the magnetic recording medium is 10 nm or more and 100 nm or less. In the present invention and the present specification, the average primary particle diameter of the carbide abrasive is a value obtained by the following method.

The carbide abrasive is imaged using a transmission electron microscope, and the captured particle photograph is printed on photographic printing paper or displayed on a display. A particle photograph can be captured, for example, by using a transmission electron microscope H-9000 manufactured by Hitachi, Ltd. at an imaging magnification of about 50,000 to 100,000×.

Fifty primary particles are randomly extracted from the captured particle photograph, and an outline of each primary particle is traced with a digitizer. The primary particle is an independent particle which is not aggregated. A diameter of a circle having the same area as the traced region (that is, circle area-equivalent diameter) is calculated. An arithmetic average of the equivalent circle diameters of the 50 particles thus calculated is used as the average primary particle diameter of the carbide abrasive. Well-known image analysis software can be used to calculate the equivalent circle diameter. As image analysis software, for example, image analysis software KS-400 manufactured by Carl Zeiss can be used. In addition, scale correction can be performed using, for example, a circle having a diameter of 1 cm in a case of incorporating an image from a scanner and performing image analysis in order to calculate the equivalent circle diameter. The average primary particle diameters of the various abrasives described in the columns of Examples described below are values obtained by performing scale correction using a circle having a diameter of 1 cm in a case of incorporating an image from a scanner and performing image analysis to calculate the equivalent circle diameter using a transmission electron microscope H-9000 manufactured by Hitachi, Ltd. as a transmission electron microscope and image analysis software KS-400 manufactured by Carl Zeiss as image analysis software at an imaging magnification of about 50,000 to 100,000×.

As the particles to be imaged, sample particles collected from the magnetic layer may be used, raw material particles before being used for forming the magnetic layer may be used, or particles of the same lot as the raw material particles used for forming the magnetic layer may be used where available. As a method of collecting sample particles from the magnetic recording medium, a method disclosed in paragraph 0015 of JP2011-048878A can be adopted, for example.

The average primary particle diameter of the carbide abrasive contained in the magnetic layer of the magnetic recording medium is 10 nm or more, and may be 20 nm or more or 30 nm or more. In addition, the average primary particle diameter of the carbide abrasive is 100 nm or less, and may be 90 nm or less, 80 nm or less, or 70 nm or less. As described above, the present inventor considers that it can be determined that the aggregation of primary particles having an average primary particle diameter of 10 nm or more and 100 nm or less is present as an aggregate by observing the aggregation in a state having a maximum Feret diameter of 0.2 µm or more.

Abrasive Aggregate Ratio

In the present invention and the present specification, the abrasive aggregate ratio is a value obtained by the following method.

The maximum Feret diameter is the maximum value of a linear length connecting two points on the particle circumference. For an aggregate in a state where a plurality of primary particles are aggregated, the maximum Feret diameter is the maximum value of a linear length connecting two points on the outer edge of the aggregate. The maximum Feret diameter and area of the aggregate can be measured by the following procedures.

(1) Acquisition of Electron Microscope Image

As the electron microscope, a field emission scanning electron microscope (FE-SEM) is used. As the FE-SEM, for example, S-4800 manufactured by Hitachi High-Tech Corporation can be used. The magnetic layer surface of the magnetic recording medium to be measured is observed in a plane by FE-SEM, and an electron microscope image is acquired. Acquisition of an electron microscope image is performed under the following conditions.

Acceleration voltage: 2 kV
Working distance (WD): 4 mm
Imaging magnification: 13,000×
Simultaneous detection of secondary electrons and backscattered electrons
Resolution: 2560 pixels×1920 pixels (2) Image Analysis The electron microscope image acquired in the above (1) is incorporated into image analysis software to be subjected to (i) binarization processing, and (ii) calculation of a total area of the carbide portion in the binarized image, specification of a portion having a maximum Feret diameter of 0.2 µm or more (that is, an aggregate) in the carbide portion, and calculation of a total area of the portion having a maximum Feret diameter of 0.2 µm or more (that is, an aggregate). By performing the binarization processing, it is possible to distinguish the carbide portion from other portions by shading in the binarized image. That is, in the binarized image, the carbide portion can be distinguished from other portions as a bright region (that is, a white part) or a dark region (that is, a black part). In the binarized image, a portion where a plurality of primary particles are aggregated, that is, an aggregate is displayed as a region surrounded by the outer edge. Therefore, a region having a maximum Feret diameter of 0.2 µm or more in the region surrounded by the outer edge can be specified as a region in which carbides are present in an aggregated state having a maximum Feret diameter of 0.2 µm or more. The carbide abrasive can be present in the magnetic layer in a form of an aggregate in which the primary particles are aggregated or primary particles. The binarized image may contain only a portion of the aggregate or only a portion of the primary particles. In such a case, the total area of the carbide portion and the total area of the portion having a maximum Feret diameter of 0.2 µm or more are calculated without including the aggregate or the primary particles. As the image analysis software, free software ImageJ can be used. For example, in Example 1 described below, ImageJ was used to perform the above (i) and (ii) under the following procedures and conditions. Noise cut processing Despeckle is executed, enhance contrast is executed, a threshold of 0 to 100 is set, and an analyze particle of 500 to pixels is set.

The threshold setting of the binarization condition is preferably adjusted according to the type of the carbide. A threshold of about 0 to 100 is appropriate for a carbide displayed as a black region in the binarized image. Meanwhile, a threshold of about 150 to 255 is appropriate for a carbide displayed as a white part in the binarized image.

In addition, the carbide portion to de distinguished by shading in the binarized image can be specified on the image in a case of being clearly specified on the electron microscope image before the binarization processing, or can also be specified by performing component analysis by SEM (for example, acquisition of a component map), or component analysis by a well-known method such as energy dispersive X-ray spectrometry (EDS) or auger electron spectroscopy (AES).

In the magnetic recording medium, the abrasive aggregate ratio is 50% or more, preferably 55% or more, more preferably 60% or more, and still more preferably 65% or more, 70% or more, 75% or more, and 80% or more in this order from the viewpoint of improving the durability of the magnetic recording medium and reducing head wear. In addition, the abrasive aggregate ratio may be 100% or less, less than 100%, 99% or less, or 95% or less. The large value of the abrasive aggregate ratio is preferable from the viewpoint of further improving the durability of the magnetic recording medium and further reducing head wear.

In order to control the abrasive aggregate ratio to 50% or more, in preparation of a magnetic layer forming composition, it is preferable to positively generate and increase the aggregate by adopting a preparation condition and/or a preparation method in which the carbide abrasive is likely to aggregate. For example, the abrasive aggregate ratio can be controlled to 50% or more by one or any combination of two or more of the following: shortening a dispersion time of a dispersion liquid of the carbide abrasive; slowing a dispersion circumferential speed of the dispersion liquid; leaving the dispersion liquid for several days; heating and concentrating the dispersion liquid; freezing and then thawing the dispersion liquid; and redispersing a precipitate obtained by centrifuging the dispersion liquid.

A content of the carbide abrasive in the magnetic layer of the magnetic recording medium is, for example, preferably 1.0 to 20.0 parts by mass and more preferably 1.0 to 10.0 parts by mass per 100 parts by mass of the ferromagnetic powder.

Hereinafter, the magnetic recording medium will be further described in detail.

Magnetic Layer

Ferromagnetic Powder

As a ferromagnetic powder contained in the magnetic layer, a well-known ferromagnetic powder as a ferromagnetic powder used in magnetic layers of various magnetic recording media can be used alone or in combination of two or more. From the viewpoint of improving recording density, it is preferable to use a ferromagnetic powder having a small average particle size. From this point, the average particle size of the ferromagnetic powder is preferably 50 nm or less, more preferably 45 nm or less, still more preferably 40 nm or less, still more preferably 35 nm or less, still more preferably 30 nm or less, still more preferably 25 nm or less, and still more preferably 20 nm or less. On the other hand, from the viewpoint of magnetization stability, the average particle size of the ferromagnetic powder is preferably 5 nm or more, more preferably 8 nm or more, still more preferably 10 nm or more, still more preferably 15 nm or more, and still more preferably 20 nm or more.

Regarding the particle size of the ferromagnetic powder, an average particle volume may be used as an index of the particle size. From the viewpoint of improving recording density, the average particle volume is preferably 2500 $nm^3$ or less, more preferably 2300 $nm^3$ or less, still more preferably 2000 $nm^3$ or less, and still more preferably 1500 $nm^3$ or less. From the viewpoint of magnetization stability, the average particle volume of the ferromagnetic powder is preferably 500 $nm^3$ or more, more preferably 600 $nm^3$ or more, even more preferably 650 $nm^3$ or more, and still preferably 700 $nm^3$ or more. The average particle volume described above is a value obtained as a sphere-equivalent volume from the average particle size obtained by a method described below.

Hexagonal Ferrite Powder

Preferred specific examples of the ferromagnetic powder include a hexagonal ferrite powder.

For details of the hexagonal ferrite powder, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to, for example.

In the present invention and the present specification, the term "hexagonal ferrite powder" refers to a ferromagnetic powder in which a hexagonal ferrite crystal structure is detected as a main phase by X-ray diffraction analysis.

The main phase refers to a structure to which the highest intensity diffraction peak in an X-ray diffraction spectrum obtained by X-ray diffraction analysis is attributed. For example, in a case where the highest intensity diffraction peak is attributed to a hexagonal ferrite crystal structure in the X-ray diffraction spectrum obtained by X-ray diffraction analysis, it is determined that the hexagonal ferrite crystal structure is detected as the main phase. In a case where only a single structure is detected by X-ray diffraction analysis, this detected structure is set as the main phase. The hexagonal ferrite crystal structure includes at least an iron atom, a divalent metal atom, and an oxygen atom, as a constituent atom. The divalent metal atom is a metal atom that can be a divalent cation as an ion, and examples thereof may include an alkaline earth metal atom such as a strontium atom, a barium atom, and a calcium atom, and a lead atom. In the present invention and the present specification, a hexagonal strontium ferrite powder refers to a powder in which a main divalent metal atom is a strontium atom, and a hexagonal barium ferrite powder refers to a powder in which a main divalent metal atom is a barium atom. The main divalent metal atom refers to a divalent metal atom that accounts for the most on atom % basis in the divalent metal atom included in the powder. Note that a rare earth atom is not included in the above divalent metal atom. The "rare earth atom" in the present invention and the present specification is selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), a europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder, which is an aspect of the hexagonal ferrite powder, will be described in more detail.

An activation volume of the hexagonal strontium ferrite powder is preferably in a range of 800 to 1600 $nm^3$. The finely granulated hexagonal strontium ferrite powder having an activation volume in the above range is suitable for producing a magnetic recording medium exhibiting excellent electromagnetic conversion characteristics. The activation volume of the hexagonal strontium ferrite powder is preferably 800 $nm^3$ or more, and may be, for example, 850 $nm^3$ or more. Further, from the viewpoint of further improving the electromagnetic conversion characteristics, the activation volume of the hexagonal strontium ferrite powder is more preferably 1500 $nm^3$ or less, still more preferably 1400 $nm^3$ or less, still more preferably 1300 $nm^3$ or less, still more preferably 1200 $nm^3$ or less, and still more preferably 1100 $nm^3$ or less. The same applies to an activation volume of the hexagonal barium ferrite powder.

The term "activation volume" refers to a unit of magnetization reversal and is an index indicating the magnetic size of a particle. An activation volume described in the present invention and the present specification and an anisotropy constant Ku which will be described below are values obtained from the following relational expression between a coercivity Hc and an activation volume V, by performing measurement in a coercivity Hc measurement portion at a magnetic field sweep rate of 3 minutes and 30 minutes using a vibrating sample magnetometer (measurement temperature: 23° C.±1° C). For a unit of the anisotropy constant Ku, 1 erg/cc=1.0×10$^{-1}$ J/m$^3$.

$$Hc = 2Ku/Ms\{1-[(kT/KuV)\ln(At/0.693)]^{1/2}\}$$

[In the expression, Ku: anisotropy constant (unit: J/m$^3$), Ms: saturation magnetization (unit: kA/m), k: Boltzmann constant, T: absolute temperature (unit: K), V: activation volume (unit: cm$^3$), A: spin precession frequency (unit: s$^{-1}$), and t: magnetic field reversal time (unit: s)]

The anisotropy constant Ku can be used as an index for reducing thermal fluctuation, in other words, for improving the thermal stability. The hexagonal strontium ferrite powder preferably has Ku of 1.8×10$^5$ J/m$^3$ or more, and more preferably has Ku of 2.0×10$^5$ J/m$^3$ or more. Ku of the hexagonal strontium ferrite powder may be, for example, 2.5×10$^5$ J/m$^3$ or less. Note that since higher Ku means higher thermal stability, which is preferable, a value thereof is not limited to the values exemplified above.

The hexagonal strontium ferrite powder may or may not include a rare earth atom. In a case where the hexagonal strontium ferrite powder includes a rare earth atom, it is preferable to include a rare earth atom at a content (bulk content) of 0.5 to 5.0 atom % with respect to 100 atom % of an iron atom. In one aspect, the hexagonal strontium ferrite powder including a rare earth atom may have a rare earth atom surface layer portion uneven distribution property. In the present invention and the present specification, the "rare earth atom surface layer portion uneven distribution property" means that a rare earth atom content with respect to 100 atom % of an iron atom in a solution obtained by partially dissolving the hexagonal strontium ferrite powder with an acid (hereinafter, referred to as a "rare earth atom surface layer portion content" or simply a "surface layer portion content" for a rare earth atom.) and a rare earth atom content with respect to 100 atom % of an iron atom in a solution obtained by totally dissolving the hexagonal strontium ferrite powder with an acid (hereinafter, referred to as a "rare earth atom bulk content" or simply a "bulk content" for a rare earth atom.) satisfy a ratio of a rare earth atom surface layer portion content/a rare earth atom bulk content >1.0. A rare earth atom content in the hexagonal strontium ferrite powder described below is synonymous with the rare earth atom bulk content. On the other hand, partial dissolution using an acid dissolves a surface layer portion of a particle constituting the hexagonal strontium ferrite powder, and thus, a rare earth atom content in a solution obtained by partial dissolution is a rare earth atom content in a surface layer portion of a particle constituting the hexagonal strontium ferrite powder. A rare earth atom surface layer portion content satisfying a ratio of "rare earth atom surface layer portion content/rare earth atom bulk content >1.0" means that in a particle constituting the hexagonal strontium ferrite powder, rare earth atoms are unevenly distributed in a surface layer portion (that is, more than an inside). The surface layer portion in the present invention and the present specification means a partial region from a surface of a particle constituting the hexagonal strontium ferrite powder toward an inside.

In a case where the hexagonal strontium ferrite powder includes the rare earth atom, a rare earth atom content (bulk content) is preferably in a range of 0.5 to 5.0 atom % with respect to 100 atom % of an iron atom. It is considered that a bulk content in the above range of the included rare earth atom and uneven distribution of the rare earth atoms in a surface layer portion of a particle constituting the hexagonal strontium ferrite powder contribute to suppression of a decrease in reproduction output during repeated reproduction. It is supposed that this is because the hexagonal strontium ferrite powder includes a rare earth atom with a bulk content in the above range, and rare earth atoms are unevenly distributed in a surface layer portion of a particle constituting the hexagonal strontium ferrite powder, whereby it is possible to increase an anisotropy constant Ku. The higher a value of an anisotropy constant Ku is, the more a phenomenon called thermal fluctuation can be suppressed (in other words, thermal stability can be improved). By suppressing occurrence of thermal fluctuation, it is possible to suppress a decrease in reproduction output during repeated reproduction. It is speculated that uneven distribution of rare earth atoms in a particulate surface layer portion of the hexagonal strontium ferrite powder contributes to stabilization of spins of iron (Fe) sites in a crystal lattice of a surface layer portion, and thus, an anisotropy constant Ku may be increased.

In addition, it is speculated that the use of the hexagonal strontium ferrite powder having a rare earth atom surface layer portion uneven distribution property as a ferromagnetic powder in the magnetic layer also contributes to further prevention of scraping of the magnetic layer surface due to sliding on the magnetic head. It is speculated that this may be because uneven distribution of rare earth atoms on a surface of a particle constituting the hexagonal strontium ferrite powder contributes to an improvement of interaction between the particle surface and an organic substance (for example, a binding agent and/or an additive) included in the magnetic layer, and, as a result, a strength of the magnetic layer is improved.

From the viewpoint of further suppressing a decrease in reproduction output during repeated reproduction and/or the viewpoint of further improving running durability, the rare earth atom content (bulk content) is more preferably in a range of 0.5 to 4.5 atom %, still more preferably in a range of 1.0 to 4.5 atom %, and still more preferably in a range of 1.5 to 4.5 atom %.

The bulk content is a content obtained by totally dissolving hexagonal strontium ferrite powder. In the present invention and the present specification, unless otherwise noted, the content of an atom means a bulk content obtained by totally dissolving the hexagonal strontium ferrite powder. The hexagonal strontium ferrite powder including a rare earth atom may include only one kind of rare earth atom as the rare earth atom, or may include two or more kinds of rare earth atoms. The bulk content in a case of including two or more kinds of rare earth atoms is obtained for the total of two or more kinds of rare earth atoms. This also applies to other components in the present invention and the present specification. That is, unless otherwise noted, a certain component may be used alone or in combination of two or more. A content amount or a content in a case where two or more components are used refers to that for the total of two or more components.

In a case where the hexagonal strontium ferrite powder includes a rare earth atom, the included rare earth atom need only be any one or more of rare earth atoms. As a rare earth atom that is preferable from the viewpoint of further suppressing a decrease in reproduction output during repeated reproduction, there are a neodymium atom, a samarium atom, an yttrium atom, and a dysprosium atom, here, the neodymium atom, the samarium atom, and the yttrium atom are more preferable, and a neodymium atom is still more preferable.

In the hexagonal strontium ferrite powder having a rare earth atom surface layer portion uneven distribution property, the rare earth atoms need only be unevenly distributed in the surface layer portion of a particle constituting the hexagonal strontium ferrite powder, and the degree of uneven distribution is not limited. For example, for the hexagonal strontium ferrite powder having a rare earth atom surface layer portion uneven distribution property, a ratio of a surface layer portion content of a rare earth atom obtained by partial dissolution under dissolution conditions which will be described below to a bulk content of a rare earth atom obtained by total dissolution under dissolution conditions which will be described below, that is, "surface layer portion content/bulk content" exceeds 1.0 and may be 1.5 or more. The fact that "surface layer portion content/bulk content" is larger than 1.0 means that in a particle constituting the hexagonal strontium ferrite powder, rare earth atoms are unevenly distributed in the surface layer portion (that is, more than an inside). Further, a ratio of a surface layer portion content of a rare earth atom obtained by partial dissolution under dissolution conditions which will be described below to a bulk content of a rare earth atom obtained by total dissolution under the dissolution conditions which will be described below, that is, "surface layer portion content/bulk content" may be, for example, 10.0 or less, 9.0 or less, 8.0 or less, 7.0 or less, 6.0 or less, 5.0 or less, or 4.0 or less. Note that, in the hexagonal strontium ferrite powder having a rare earth atom surface layer portion uneven distribution property, the rare earth atoms need only be unevenly distributed in the surface layer portion of a particle constituting the hexagonal strontium ferrite powder, and the "surface layer portion content/bulk content" is not limited to the exemplified upper limit or lower limit.

The partial dissolution and the total dissolution of the hexagonal strontium ferrite powder will be described below. For the hexagonal strontium ferrite powder present as a powder, the partially and totally dissolved sample powder is collected from the same lot of powder. Meanwhile, for the hexagonal strontium ferrite powder included in the magnetic layer of the magnetic recording medium, a part of the hexagonal strontium ferrite powder extracted from the magnetic layer is subjected to partial dissolution, and the other part is subjected to total dissolution. The hexagonal strontium ferrite powder can be extracted from the magnetic layer by a method disclosed in a paragraph 0032 of JP2015-91747A, for example.

The partial dissolution means that dissolution is performed such that, at the end of dissolution, the residue of the hexagonal strontium ferrite powder can be visually confirmed in the solution. For example, by partial dissolution, it is possible to dissolve a region of 10 to 20 mass % of the particle constituting the hexagonal strontium ferrite powder with the total particle being 100 mass %. On the other hand, the total dissolution means that dissolution is performed such that, at the end of dissolution, the residue of the hexagonal strontium ferrite powder cannot be visually confirmed in the solution.

The partial dissolution and measurement of the surface layer portion content are performed by the following method, for example. Note that the following dissolution conditions such as the amount of sample powder are exemplified, and dissolution conditions for partial dissolution and total dissolution can be adopted in any manner.

A container (for example, a beaker) containing 12 mg of the sample powder and 10 mL of 1 mol/L hydrochloric acid is held on a hot plate at a set temperature of 70° C. for 1 hour. The obtained solution is filtered by a membrane filter of 0.1 µm. Elemental analysis of the filtrated solution thus obtained is performed by an inductively coupled plasma (ICP) analyzer. In this way, the surface layer portion content of a rare earth atom with respect to 100 atom % of an iron atom can be obtained. In a case where a plurality of kinds of rare earth atoms are detected by elemental analysis, the total content of all rare earth atoms is defined as the surface layer portion content. This also applies to the measurement of the bulk content.

Meanwhile, the total dissolution and measurement of the bulk content are performed by the following method, for example.

A container (for example, a beaker) containing 12 mg of the sample powder and 10 mL of 4 mol/L hydrochloric acid is held on a hot plate at a set temperature of 80° C. for 3 hours. Thereafter, the same procedure as the partial dissolution and the measurement of the surface layer portion content is carried out, and the bulk content with respect to 100 atom % of an iron atom can be obtained.

From the viewpoint of increasing the reproduction output in a case of reproducing data recorded on the magnetic recording medium, it is desirable that mass magnetization σs of the ferromagnetic powder included in the magnetic recording medium is high. In this regard, the hexagonal strontium ferrite powder including a rare earth atom but not having the rare earth atom surface layer portion uneven distribution property tends to have a larger decrease in σs than that of the hexagonal strontium ferrite powder including no rare earth atom. With respect to this, it is considered that the hexagonal strontium ferrite powder having a rare earth atom surface layer portion uneven distribution property is preferable in suppressing such a large decrease in σs. In one aspect, σs of the hexagonal strontium ferrite powder may be 45 A·m$^2$/kg or more, and may be 47 A·m$^2$/kg or more. On the other hand, from the viewpoint of noise reduction, σs is preferably 80 A·m$^2$/kg or less and more preferably 60 A·m$^2$/kg or less. σs can be measured using a well-known measuring device, such as a vibrating sample magnetometer, capable of measuring magnetic properties. In the present invention and the present specification, unless otherwise noted, the mass magnetization σs is a value measured at a magnetic field intensity of 15 kOe. 1 [kOe]= $10^6/4\pi$[A/m]

Regarding the content (bulk content) of a constituent atom of the hexagonal strontium ferrite powder, a strontium atom content may be, for example, in a range of 2.0 to 15.0 atom % with respect to 100 atom % of an iron atom. In one aspect, in the hexagonal strontium ferrite powder, the divalent metal atom included in this powder can be only a strontium atom. In another aspect, the hexagonal strontium ferrite powder may include one or more other divalent metal atoms in addition to the strontium atom. For example, a barium atom and/or a calcium atom may be included. In a case where the other divalent metal atoms other than the strontium atom are included, a content of the barium atom and a content of the calcium atom in the hexagonal strontium ferrite powder respectively can be, for example, in a range of 0.05 to 5.0 atom % with respect to 100 atom % of the iron atom.

As the hexagonal ferrite crystal structure, a magnetoplumbite type (also referred to as an "M type"), a W type, a Y type, and a Z type are known. The hexagonal strontium ferrite powder may have any crystal structure. The crystal structure can be confirmed by X-ray diffraction analysis. In the hexagonal strontium ferrite powder, a single crystal structure or two or more crystal structures may be detected by X-ray diffraction analysis. For example, according to one aspect, in the hexagonal strontium ferrite powder, only the M-type crystal structure may be detected by X-ray diffraction analysis. For example, M-type hexagonal ferrite is represented by a composition formula of $AFe_{12}O_{19}$. Here, A represents a divalent metal atom, and in a case where the hexagonal strontium ferrite powder is the M-type, A is only a strontium atom (Sr), or in a case where, as A, a plurality of divalent metal atoms are included, as described above, a strontium atom (Sr) accounts for the most on atom % basis. The divalent metal atom content of the hexagonal strontium ferrite powder is usually determined by the type of crystal structure of the hexagonal ferrite and is not particularly limited. The same applies to the iron atom content and the oxygen atom content. The hexagonal strontium ferrite powder may include at least an iron atom, a strontium atom, and an oxygen atom, and may further include a rare earth atom. Furthermore, the hexagonal strontium ferrite powder may or may not include atoms other than these atoms. As an example, the hexagonal strontium ferrite powder may include an aluminum atom (Al). A content of an aluminum atom maybe, for example, 0.5 to 10.0 atom % with respect to 100 atom % of an iron atom. From the viewpoint of further suppressing a decrease in reproduction output during repeated reproduction, the hexagonal strontium ferrite powder includes an iron atom, a strontium atom, an oxygen atom, and a rare earth atom, and the content of atoms other than these atoms is preferably 10.0 atom % or less, more preferably in a range of 0 to 5.0 atom %, and may be 0 atom % with respect to 100 atom % of an iron atom. That is, in one aspect, the hexagonal strontium ferrite powder may not include atoms other than an iron atom, a strontium atom, an oxygen atom, and a rare earth atom. The content expressed in atom % is obtained by converting a content of each atom (unit: mass %) obtained by totally dissolving the hexagonal strontium ferrite powder into a value expressed in atom % using an atomic weight of each atom. Further, in the present invention and the present specification, the term "not include" for a certain atom means that a content measured by an ICP analyzer after total dissolution is 0 mass %. A detection limit of the ICP analyzer is usually 0.01 parts per million (ppm) or less on a mass basis. The term "not included" is used as a meaning including that an atom is included in an amount less than the detection limit of the ICP analyzer. In one aspect, the hexagonal strontium ferrite powder may not include a bismuth atom (Bi).

Metal Powder

Preferred specific examples of the ferromagnetic powder include a ferromagnetic metal powder. For details of the ferromagnetic metal powder, descriptions disclosed in paragraphs 0137 to 0141 of JP2011-216149A and paragraphs 0009 to 0023 of JP2005-251351A can be referred to, for example.

ε-Iron Oxide Powder

Preferred specific examples of the ferromagnetic powder include an ε-iron oxide powder. In the present invention and the present specification, the term "ε-iron oxide powder" refers to a ferromagnetic powder in which an ε-iron oxide crystal structure is detected as a main phase by X-ray diffraction analysis. For example, in a case where the highest intensity diffraction peak is attributed to an ε-iron oxide crystal structure in an X-ray diffraction spectrum obtained by X-ray diffraction analysis, it is determined that the ε-iron oxide crystal structure is detected as the main phase. As a method of manufacturing an ε-iron oxide powder, a producing method from a goethite, a reverse micelle method, and the like are known. All of the manufacturing methods are well known. Regarding a method of manufacturing an ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. S1, pp. S280 to S284, J. Mater. Chem. C, 2013, 1, pp. 5200 to 5206 can be referred to, for example. Note that the manufacturing method of the ε-iron oxide powder capable of being used as the ferromagnetic powder in the magnetic layer of the magnetic recording medium is not limited to the methods described here.

An activation volume of the ε-iron oxide powder is preferably in a range of 300 to 1500 $nm^3$. The finely granulated ε-iron oxide powder having an activation volume in the above range is suitable for producing a magnetic recording medium exhibiting excellent electromagnetic conversion characteristics. The activation volume of the ε-iron oxide powder is preferably 300 $nm^3$ or more, and may be, for example, 500 $nm^3$ or more. In addition, from the viewpoint of further improving the electromagnetic conversion characteristics, the activation volume of the ε-iron oxide powder is more preferably 1400 $nm^3$ or less, still more preferably 1300 $nm^3$ or less, still more preferably 1200 $nm^3$ or less, and still more preferably 1100 $nm^3$ or less.

The anisotropy constant Ku can be used as an index for reducing thermal fluctuation, in other words, for improving the thermal stability. The ε-iron oxide powder preferably has Ku of $3.0 \times 10^4$ $J/m^3$ or more, and more preferably has Ku of $8.0 \times 10^4$ $J/m^3$ or more. Ku of the ε-iron oxide powder may be, for example, $3.0 \times 10^5$ $J/m^3$ or less. Note that since higher Ku means higher thermal stability, which is preferable, a value thereof is not limited to the values exemplified above.

From the viewpoint of increasing the reproduction output in a case of reproducing data recorded on the magnetic recording medium, it is desirable that mass magnetization σs of the ferromagnetic powder included in the magnetic recording medium is high. In this regard, in one aspect, σs of the ε-iron oxide powder may be 8 $A \cdot m^2/kg$ or more, and may be 12 $A \cdot m^2/kg$ or more. On the other hand, from the viewpoint of noise reduction, σs of the ε-iron oxide powder is preferably 40 $A \cdot m^2/kg$ or less and more preferably 35 $A \cdot m^2/kg$ or less.

In the present invention and the present specification, unless otherwise noted, an average particle size of various powders such as ferromagnetic powders is a value measured by the following method using a transmission electron microscope. An average primary particle diameter of the carbide abrasive is obtained by the method described above.

The powder is imaged at an imaging magnification of 100,000× with a transmission electron microscope, and the image is printed on photographic printing paper or displayed on a display so that the total magnification is 500,000×, to obtain an image of particles configuring the powder. A target particle is selected from the obtained image of particles, an outline of the particle is traced by a digitizer, and a size of the particle (primary particle) is measured. As described above, the primary particle is an independent particle which is not aggregated.

The measurement described above is performed regarding 500 particles randomly extracted. An arithmetic average of the particle sizes of 500 particles thus obtained is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. An average particle size shown in Examples which will be described below is a value measured by using a transmission electron microscope H-9000 manufactured by Hitachi, Ltd. as the transmission electron microscope, and image analysis software KS-400 manufactured by Carl Zeiss as the image analysis software, unless otherwise noted. In the present invention and the present specification, the powder means aggregation of a plurality of particles. For example, ferromagnetic powder means aggregation of a plurality of ferromagnetic particles. Further, the aggregation of the plurality of particles not only includes an aspect in which particles constituting the aggregate directly come into contact with each other, but also includes an aspect in which a binding agent or an additive which will be described below is interposed between the particles. The term "particle" is used to describe a powder in some cases. As described above, the present inventor speculates that amorphous carbon may be present between the primary particles in the aggregate of carbide abrasive. Note that this is merely speculation and does not limit the present invention.

As a method of collecting sample powder from the magnetic recording medium in order to measure the particle size, a method disclosed in a paragraph 0015 of JP2011-048878A can be adopted, for example.

In the present invention and the present specification, unless otherwise noted, (1) in a case where the shape of the particle observed in the particle photograph described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a plate shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an amorphous shape, and the long axis configuring the particles cannot be specified from the shape, the particle size is shown as an equivalent circle diameter. The equivalent circle diameter refers to a value obtained by a circle projection method.

In addition, a length of a short axis, that is, a short axis length of the particles is measured in the measurement described above, and an acicular ratio of the powder is obtained as a value of "average long axis length/average short axis length" from an arithmetic average (average long axis length) of the long axis lengths obtained regarding the 500 particles and an arithmetic average (average short axis length) of short axis lengths. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (average long axis length/average short axis length) is assumed as 1, for convenience.

In addition, unless otherwise noted, in a case where the shape of the particle is specified, for example, in a case of definition of the particle size (1), the average particle size is an average long axis length, and in a case of the definition (2), the average particle size is an average plate diameter. In a case of the definition (3), the average particle size is an average diameter (also referred to as an average particle diameter).

The content (filling percentage) of the ferromagnetic powder of the magnetic layer is preferably in a range of 50 to 90 mass % and more preferably in a range of 60 to 90 mass %, with respect to the total mass of the magnetic layer.

Binding Agent

The magnetic recording medium can be a coating type magnetic recording medium, and can include a binding agent in the magnetic layer. The binding agent is one or more resins. As the binding agent, various resins usually used as a binding agent of a coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be homopolymers or copolymers. These resins can be used as the binding agent even in a non-magnetic layer and/or a back coating layer which will be described below.

For the binding agent described above, descriptions disclosed in paragraphs 0028 to 0031 of JP2010-24113A can be referred to. An average molecular weight of the resin used as the binding agent can be, for example, 10,000 to 200,000 as a weight-average molecular weight. The weight-average molecular weight of the binding agent in the present invention and the present specification is a value obtained by performing polystyrene conversion of a value measured by gel permeation chromatography (GPC). The weight-average molecular weight of the binding agent shown in Examples described below is a value obtained by performing polystyrene conversion of a value measured under the following measurement conditions. The binding agent may be used in an amount of, for example, 1.0 to 30.0 parts by mass with respect to 100.0 parts by mass of the ferromagnetic powder.

GPC device: HLC-8120 (manufactured by Tosoh Corporation)

Column: TSK gel Multipore HXL-M (manufactured by Tosoh Corporation, 7.8 mm inner diameter (ID)×30.0 cm)

Eluent: Tetrahydrofuran (THF)

Curing Agent

A curing agent can also be used together with the resin which can be used as the binding agent. As the curing agent, in one aspect, a thermosetting compound which is a compound in which curing reaction (crosslinking reaction) proceeds due to heating can be used, and in another aspect, a photocurable compound in which a curing reaction (crosslinking reaction) proceeds due to light irradiation can be used. The curing reaction proceeds in a magnetic layer forming step, whereby at least a part of the curing agent can be included in the magnetic layer in a state of being reacted (crosslinked) with other components such as the binding agent.

The same applies to the layer formed using this composition in a case where the composition used to form the other layer includes a curing agent. The preferred curing agent is a thermosetting compound, polyisocyanate is suitable. For details of the polyisocyanate, descriptions disclosed in paragraphs 0124 and 0125 of JP2011-216149A can be referred to. The curing agent can be used in an amount of, for example, 0 to 80.0 parts by mass, and preferably 50.0 to 80.0 parts by mass with respect to 100.0 parts by mass of the binding agent, for preparing the magnetic layer forming composition.

Additive

The magnetic layer may include one or more kinds of additives, as necessary. As the additive, a commercially available product can be suitably selected or manufactured by a well-known method according to the desired properties, and any amount thereof can be used. As the additives, the curing agent described above is used as an example. In addition, examples of the additive which can be included in the magnetic layer include a non-magnetic powder, a lubricant, a dispersing agent, a dispersing assistant, a fungicide, an antistatic agent, and an antioxidant. For example, for the lubricant, descriptions disclosed in paragraphs 0030 to 0033, 0035, and 0036 of JP2016-126817A can be referred to. The non-magnetic layer described below may include a lubricant. For the lubricant which may be included in the non-magnetic layer, descriptions disclosed in paragraphs 0030, 0031, and 0034 to 0036 of JP2016-126817A can be referred to. For the dispersing agent, descriptions disclosed in paragraphs 0061 and 0071 of JP2012-133837A can be referred to. The dispersing agent may be added to a non-magnetic layer forming composition. For the dispersing agent that can be added to the non-magnetic layer forming composition, a description disclosed in a paragraph 0061 of JP2012-133837A can be referred to.

Examples of the non-magnetic powder that can be included in the magnetic layer include a non-magnetic powder (for example, a non-magnetic colloidal particles and carbon black) that can function as a protrusion forming agent which forms protrusions appropriately protruded from the magnetic layer surface. As the protrusion forming agent, for example, carbon black having an average particle size of 5 to 300 nm can be used. An average particle size of colloidal silica (silica colloidal particles) shown in Examples described below is a value obtained by a method disclosed as a measurement method of an average particle diameter in a paragraph 0015 of JP2011-048878A. A content of the protrusion forming agent in the magnetic layer is, for example, preferably 0.1 to 3.5 parts by mass, and more preferably 0.1 to 3.0 parts by mass per 100.0 parts by mass of the ferromagnetic powder.

The magnetic layer described above can be provided on a surface of the non-magnetic support directly or indirectly through the non-magnetic layer.

Non-Magnetic Layer

Next, the non-magnetic layer will be described. The magnetic recording medium may include a magnetic layer directly on the non-magnetic support surface or may include a magnetic layer on the non-magnetic support surface through one or a plurality of non-magnetic layers including a non-magnetic powder.

In order to increase smoothness of the magnetic layer surface, it is preferable to increase surface smoothness of the non-magnetic layer which is a surface on which the magnetic layer is to be formed. From this point, it is preferable to use a non-magnetic powder having a small average particle size as the non-magnetic powder included in the non-magnetic layer. An average particle size of the non-magnetic powder is preferably in a range of 500 nm or less, more preferably 200 nm or less, still more preferably 100 nm or less, and still more preferably 50 nm or less. In addition, from the viewpoint of ease of improving dispersibility of the non-magnetic powder, the average particle size of the non-magnetic powder is preferably 5 nm or more, more preferably 7 nm or more, and still more preferably 10 nm or more.

The non-magnetic powder used for the non-magnetic layer may be an inorganic powder or an organic powder. In addition, carbon black and the like can be used.

For carbon black capable of being used in the non-magnetic layer, for example, a description disclosed in paragraphs 0040 and 0041 of JP2010-24113A can be referred to. Carbon black generally tends to have a large particle size distribution and tends to have poor dispersibility. Therefore, the non-magnetic layer including carbon black tends to have low surface smoothness. From this point, in one aspect, it is preferable to provide a non-magnetic layer including a non-magnetic powder other than the carbon black, as the non-magnetic layer adjacent to the magnetic layer.

In addition, it is preferable to provide a plurality of non-magnetic layers and to set the non-magnetic layer positioned closest to the magnetic layer as a non-magnetic layer including a non-magnetic powder other than the carbon black. For example, it is preferable that two non-magnetic layers are provided between the non-magnetic support and the magnetic layer, the non-magnetic layer on the non-magnetic support side (also referred to as a "lower non-magnetic layer") is set as a non-magnetic layer including carbon black, and the non-magnetic layer on the magnetic layer side (also referred to as an "upper non-magnetic layer") is set as a non-magnetic layer including the non-magnetic powder other than carbon black. In addition, in the non-magnetic layer forming composition including a plurality of kinds of non-magnetic powders, the dispersibility of the non-magnetic powder tends to be easily deteriorated, compared to that in the non-magnetic layer forming composition including one kind of non-magnetic powder. From this point, it is preferable to provide a plurality of non-magnetic layers and to reduce the kinds of the non-magnetic powder included in each non-magnetic layer. In addition, in one aspect, it is preferable to use a dispersing agent, in order to increase the dispersibility of the non-magnetic powder in the non-magnetic layer forming composition including a plurality of kinds of non-magnetic powders. Such a dispersing agent will be described below.

Examples of the inorganic powder include powders of metal, metal oxide, metal carbonate, metal sulfate, metal nitride, metal carbide, and metal sulfide. These non-magnetic powders can be purchased as a commercially available product or can be manufactured by a well-known method. For details thereof, descriptions disclosed in paragraphs 0146 to 0150 of JP2011-216149A can be referred to.

As one aspect of the non-magnetic powder, a non-magnetic iron oxide powder can be used. It is preferable to use a powder having a small particle size as the non-magnetic iron oxide powder, from the viewpoint of increasing the surface smoothness of the non-magnetic layer on which the magnetic layer is to be formed. From this point, it is preferable to use a non-magnetic iron oxide powder having an average particle size in the range described above. In a case where the non-magnetic iron oxide powder has a particle shape of (1) described above, the average particle size is the average long axis length. The acicular ratio (average long axis length/average short axis length) of the non-magnetic iron oxide powder can be more than 1.0. It is preferable to use a powder having a small acicular ratio value as the non-magnetic iron oxide powder, from the viewpoint of improving the surface smoothness of the non-magnetic layer. The acicular ratio (average long axis length/average short axis length) of the non-magnetic iron oxide powder may be, for example, 7.0 or less, and preferably 3.0 or less and more preferably 1.5 or less. As the non-magnetic iron oxide powder, in one aspect, an α-iron oxide powder is preferable. The α-iron oxide is an iron oxide having an a phase as a main phase.

The content (filling percentage) of the non-magnetic powder of the non-magnetic layer is preferably in a range of 50 to 90 mass % and more preferably in a range of 60 to 90 mass %, with respect to the total mass of the non-magnetic layer. In a case where a plurality of non-magnetic layers are provided, the content of the non-magnetic powder in at least one non-magnetic layer is preferably in the range described above, and the content of the non-magnetic powder in more non-magnetic layers is more preferably in the range described above.

The non-magnetic layer contains a non-magnetic powder and can also contain a binding agent together with the non-magnetic powder. For other details of the binding agent or the additive of the non-magnetic layer, a well-known technology regarding the non-magnetic layer can be applied. In addition, in regards to the type and the content of the binding agent, and the type and the content of the additive, for example, a well-known technology regarding the magnetic layer can be applied.

As the additive that can be included in the non-magnetic layer, a dispersing agent that can contribute to an improvement of the dispersibility of the non-magnetic powder can be used. Examples of the dispersing agent include a fatty acid represented by RCOOH (R is an alkyl group or an alkenyl group) (for example, a caprylic acid, a capric acid, a lauric acid, a myristic acid, a palmitic acid, a stearic acid, a behenic acid, an oleic acid, an elaidic acid, a linoleic acid, a linolenic acid, and the like); alkali metal salt or alkaline earth metal salt of the fatty acid; ester of the fatty acid; a compound containing fluorine of ester of the fatty acid; amide of the fatty acid; polyalkylene oxide alkyl phosphates ester; lecithin; trialkyl polyolefin oxyquaternary ammonium salt (alkyl group contained is an alkyl group having 1 to 5 carbon atoms, olefin contained is ethylene, propylene, or the like); phenylphosphonic acid; and copper phthalocyanine. These may be used alone or in combination of two or more kinds thereof. The content of the dispersing agent is preferably 0.2 to 5.0 parts by mass with respect to 100.0 parts by mass of the non-magnetic powder.

In addition, as an example of an additive, organic tertiary amine can be used. For the organic tertiary amine, descriptions disclosed in paragraphs 0011 to 0018 and 0021 of JP2013-049832A can be referred to. The organic tertiary amine can contribute to an improvement of dispersibility of carbon black. For the formulation of a composition for increasing the dispersibility of carbon black with the organic tertiary amine, paragraphs 0022 to 0024 and 0027 of JP2013-049832A can be referred to.

The amine is more preferably trialkylamine. The alkyl group contained in the trialkylamine is preferably an alkyl group having 1 to 18 carbon atoms. Three alkyl groups contained in the trialkylamine may be the same as or different from each other. For details of the alkyl group, descriptions disclosed in paragraphs 0015 and 0016 of JP2013-049832A can be referred to. As the trialkylamine, trioctylamine is particularly preferable.

The non-magnetic layer of the present invention and the present specification also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having a coercivity equal to or smaller than 7.96 kA/m (100 Oe), or a layer having a residual magnetic flux density equal to or smaller than 10 mT and a coercivity equal to or smaller than 7.96 kA/m (100 Oe). It is preferable that the non-magnetic layer does not have a residual magnetic flux density and coercivity.

Non-Magnetic Support

Next, the non-magnetic support will be described. Examples of the non-magnetic support (hereinafter, simply referred to as a "support") include well-known components such as polyethylene terephthalate, polyethylene naphthalate, polyamide, polyamideimide, and aromatic polyamide subjected to biaxial stretching. Among these, polyethylene terephthalate, polyethylene naphthalate, and polyamide are preferable. A corona discharge, a plasma treatment, an easy-bonding treatment, or a heat treatment may be performed on these supports in advance.

Back Coating Layer

The magnetic recording medium may or may not include a back coating layer including a non-magnetic powder on a surface side of the non-magnetic support opposite to a surface side on which the magnetic layer is provided. The back coating layer preferably contains any one or both of carbon black and an inorganic powder. The back coating layer can include a binding agent and can also include additives. For the binding agent and additive in the back coating layer, a well-known technology for the back coating layer can be applied, and a well-known technology for the formulation of the magnetic layer and/or the non-magnetic layer can also be applied. For example, for the back coating layer, descriptions disclosed in paragraphs 0018 to 0020 of JP2006-331625A and page 4, line 65, to page 5, line 38, of U.S. Pat. No. 7,029,774B can be referred to.

Various Thicknesses

Regarding a thickness (total thickness) of the magnetic recording medium, it has been required to increase the recording capacity (increase the capacity) of the magnetic recording medium with the enormous increase in the amount of information in recent years. For example, as means for increasing the capacity, a thickness of the magnetic recording medium may be reduced (hereinafter, also referred to as "thinning") to increase a length of the magnetic tape accommodated in one roll of a magnetic tape cartridge. From this point, the thickness (total thickness) of the magnetic recording medium is preferably 5.6 µm or less, more preferably 5.5 m or less, still more preferably 5.4 µm or less, still preferably 5.3 µm or less, and still more preferably 5.2 µm or less. In addition, from the viewpoint of ease of handling, the thickness of the magnetic recording medium is preferably 3.0 µm or more, and more preferably 3.5 µm or more.

For example, the thickness (total thickness) of the magnetic tape can be measured by the following method.

Ten tape samples (for example, 5 to 10 cm in length) are cut out from any part of the magnetic tape, and these tape samples are stacked to measure the thickness. A value (thickness per tape sample) obtained by dividing the measured thickness by 1/10 is defined as the tape thickness. The thickness measurement can be performed using a well-known measuring instrument capable of measuring a thickness on the order of 0.1 µm.

A thickness of the non-magnetic support is preferably 3.0 to 5.0 µm.

A thickness of the magnetic layer can be optimized according to a saturation magnetization amount of a magnetic head used, a head gap length, a recording signal band, and the like, is generally 0.01 µm to 0.15 m, and is preferably 0.02 µm to 0.12 µm and more preferably 0.03 µm to 0.1 m, from a viewpoint of realization of high-density recording. The magnetic layer may be at least one layer, or the magnetic layer can be separated into two or more layers having different magnetic properties, and a configuration regarding a well-known multilayered magnetic layer can be applied. A thickness of the magnetic layer in a case where the magnetic layer is separated into two or more layers is a total thickness of the layers. This point also applies to the thickness of the non-magnetic layer in the magnetic recording medium including a plurality of non-magnetic layers.

Regarding the thickness of the non-magnetic layer, as a thicker non-magnetic layer is formed, a presence state of the particles of the non-magnetic powder easily becomes non-uniform in a coating step and a drying step of the non-magnetic layer forming composition, and the difference in thickness at each position tends to increase thereby roughening the surface of the non-magnetic layer. From the viewpoint of increasing the smoothness of the magnetic layer surface, it is preferable that the surface smoothness of the non-magnetic layer is high. From this point, the thickness of the non-magnetic layer is preferably less than 1.0 µm, more preferably 0.9 µm or less, and still more preferably 0.8 µm or less. In addition, the thickness of the non-magnetic layer is preferably 0.05 µm or more and more preferably 0.1 µm or more, from the viewpoint of improving the uniformity of coating of the non-magnetic layer forming composition. From the viewpoint of further improving the durability of the magnetic recording medium, the thickness of the non-magnetic layer is preferably more than 0.5 µm and more preferably 0.6 µm or more.

A thickness of the back coating layer is preferably 0.9 µm or less and more preferably 0.1 m or more and 0.7 µm or less.

The thicknesses of various layers and the non-magnetic support can be obtained by the following method.

A cross section of the magnetic recording medium in a thickness direction is exposed by an ion beam, and then the exposed cross section observation is performed using a scanning electron microscope or a transmission electron microscope in the exposed cross section.

Various thicknesses can be obtained as an arithmetic average of thicknesses obtained at two optional points.

Alternatively, the various thicknesses can be obtained as a designed thickness calculated according to manufacturing conditions. The thicknesses of various layers shown in the columns of Examples described below are designed thicknesses calculated from the manufacturing conditions.

Manufacturing Step

Preparation of Each Layer Forming Composition

A step of preparing a composition for forming the magnetic layer, the non-magnetic layer, or the back coating layer can usually include at least a kneading step, a dispersing step, and, as necessary, a mixing step provided before and after these steps. Each step may be divided into two or more stages. Components used for the preparation of each layer forming composition may be added at an initial stage or in a middle stage of each step. As a solvent, one or more kinds of various solvents usually used for manufacturing a coating type magnetic recording medium can be used. For the solvent, for example, a description disclosed in a paragraph 0153 of JP2011-216149A can be referred to. In addition, each component may be separately added in two or more steps. For example, a binding agent may be added separately in a kneading step, a dispersing step, and a mixing step for adjusting a viscosity after dispersion. In order to manufacture the above magnetic recording medium, a well-known manufacturing technology can be used in various steps. In the kneading step, an open kneader, a continuous kneader, a pressure kneader, or a kneader having a strong kneading force such as an extruder is preferably used.

For details of the kneading treatment, descriptions disclosed in JP1989-106338A (JP-H01-106338A) and JP1989-79274A (JP-H01-79274A) can be referred to. As a dispersing device, a well-known dispersing device can be used. Specific examples of means for controlling the abrasive aggregate ratio to 50% or more are as described above. In any stage of preparing each layer forming composition, filtering may be performed by a well-known method. The filtering can be performed by using a filter, for example. As the filter used in the filtering, a filter having a pore diameter of 0.01 to 3 μm (for example, filter made of glass fiber or filter made of polypropylene) can be used, for example.

Coating Step

The magnetic layer can be formed by directly applying the magnetic layer forming composition onto the non-magnetic support surface or performing multilayer coating of the magnetic layer forming composition with the non-magnetic layer forming composition in order or at the same time.

The back coating layer can be formed by applying a back coating layer forming composition onto a surface of the non-magnetic support opposite to a surface having the non-magnetic layer and/or the magnetic layer (or to be provided with the non-magnetic layer and/or the magnetic layer). For details of the coating for forming each layer, a description disclosed in a paragraph 0066 of JP2010-231843A can be referred to.

Other Steps

After the coating step, various treatments such as a drying treatment, an alignment treatment of the magnetic layer, and a surface smoothing treatment (calendering treatment) can be performed. For various steps, for example, a well-known technology disclosed in paragraphs 0052 to 0057 of JP2010-24113A can be referred to. For example, the coating layer of the magnetic layer forming composition can be subjected to an alignment treatment, while the coating layer is wet. For the alignment treatment, various well-known technologies including a description disclosed in a paragraph 0067 of JP2010-231843A can be applied. For example, a vertical alignment treatment can be performed by a well-known method such as a method using a different polar opposing magnet. In an alignment zone, a drying speed of the coating layer can be controlled depending on a temperature, an air volume of drying air and/or a transportation speed of the non-magnetic support on which the coating layer is formed in the alignment zone. In addition, the coating layer may be preliminarily dried before the transportation to the alignment zone. For the calendering treatment, in a case where a calendering condition is strengthened, the smoothness of the magnetic layer surface tends to increase. Examples of the calendering condition include the number of times the calendering treatment is performed (hereinafter, also referred to as "the number of times of calendering"), a calender pressure, a calender temperature (surface temperature of a calender roll), a calender speed, and a hardness of a calender roll. As the number of times of calendering increases, the calendering treatment is enhanced. As for the calender pressure, the calender temperature, and the hardness of the calender roll, the calendering treatment is enhanced by increasing these values, and the calendering treatment is enhanced by decreasing the calender speed. For example, the calender pressure (linear pressure) may be 200 to 500 kg/cm and is preferably 250 to 350 kg/cm. The calender temperature (surface temperature of the calender roll) may be, for example, 85° C. to 120° C. and is preferably 90° C. to 110° C., and the calender speed may be, for example, 50 to 300 m/min and is preferably 50 to 200 m/min.

Through various steps, a long magnetic tape original roll can be obtained. The obtained magnetic tape original roll is cut (slit) by a well-known cutter, for example, to have a width of the magnetic tape to be wound around the magnetic tape cartridge. The width is determined according to the standard and is, for example, ½ inches. ½ inches=12.65 mm.

A servo pattern is usually formed on the magnetic tape obtained by slitting. Details of the servo pattern will be described below.

Heat Treatment

In one aspect, the magnetic recording medium can be a magnetic tape manufactured through the following heat treatment. In another aspect, the magnetic recording medium can be a magnetic tape manufactured without the following heat treatment.

As the heat treatment, the magnetic tape slit and cut to have a width determined according to the standard described above can be wound around a core member and can be subjected to the heat treatment in the wound state.

In one aspect, the heat treatment is performed in a state where the magnetic tape is wound around a core member for the heat treatment (hereinafter, referred to as a "winding core for heat treatment"), the magnetic tape after the heat treatment is wound around a reel of the magnetic tape cartridge, and the magnetic tape cartridge in which the magnetic tape is wound around the reel can be produced.

The winding core for heat treatment can be formed of metal, a resin, or paper. The material of the winding core for heat treatment is preferably a material having high stiffness, from the viewpoint of suppressing the occurrence of winding failure such as spoking. From this point, the winding core for heat treatment is preferably formed of metal or a resin. In addition, as an index for stiffness, a bending elastic modulus of the material of the winding core for heat treatment is preferably 0.2 GPa (Gigapascal) or more, and more preferably 0.3 GPa or more. Meanwhile, since the material having high stiffness is generally expensive, the use of the winding core for heat treatment of the material having stiffness exceeding the stiffness capable of suppressing the occurrence of the winding failure leads to an increase in cost. Considering the above point, the bending elastic modulus of the material of the winding core for heat treatment is preferably 250 GPa or less. The bending elastic modulus is a value measured in accordance with international organization for standardization (ISO) 178, and the bending elastic modulus of various materials is well-known. In addition, the winding core for heat treatment can be a solid or hollow core member. In a case of the hollow core member, a thickness thereof is preferably 2 mm or more from the viewpoint of maintaining stiffness. In addition, the winding core for heat treatment may include or may not include a flange.

It is preferable to prepare a magnetic tape having a length equal to or more than a length to be finally accommodated in the magnetic tape cartridge (hereinafter, referred to as a "final product length") as the magnetic tape wound around the winding core for heat treatment, and to perform the heat treatment by placing the magnetic tape in a heat treatment environment while being wound around the winding core for heat treatment. The length of the magnetic tape wound around the winding core for heat treatment is equal to or more than the final product length, and is preferably the "final product length+α", from the viewpoint of ease of winding around the winding core for heat treatment. This α is preferably 5 μm or more, from the viewpoint of ease of the winding. The tension during winding around the winding core for heat treatment is preferably 0.1 N (Newton) or more. In addition, from the viewpoint of suppressing the occurrence of excessive deformation, the tension during winding around the winding core for heat treatment is preferably 1.5 N or less, and more preferably 1.0 N or less. An outer diameter of the winding core for heat treatment is preferably 20 mm or more and more preferably 40 mm or more, from the viewpoint of ease of the winding and suppression of coiling (curling in longitudinal direction). In addition, the outer diameter of the winding core for heat treatment is preferably 100 mm or less, and more preferably 90 mm or less. A width of the winding core for heat treatment need only be equal to or more than the width of the magnetic tape wound around this winding core. In addition, in a case where the magnetic tape is removed from the winding core for heat treatment after the heat treatment, it is preferable to remove the magnetic tape from the winding core for heat treatment after the magnetic tape and the winding core for heat treatment are sufficiently cooled, in order to suppress occurrence of unintended deformation of the tape during the removal operation. It is preferable that the removed magnetic tape is once wound around another winding core (referred to as a "temporary winding core"), and then the magnetic tape is wound around the reel (generally, an outer diameter is about 40 to 50 mm.) of the magnetic tape cartridge from the temporary winding core. As a result, the magnetic tape can be wound around the reel of the magnetic tape cartridge while maintaining a relationship between the inner side and the outer side with respect to the winding core for heat treatment of the magnetic tape during the heat treatment. Regarding the details of the temporary winding core and the tension in a case of winding the magnetic tape around the winding core, the description described above regarding the winding core for heat treatment can be referred to. In an aspect in which the heat treatment is applied to the magnetic tape having a length of the "final product length+α", the length corresponding to "+α" need only be cut off in any stage. For example, in one aspect, the magnetic tape for the final product length need only be wound around the reel of the magnetic tape cartridge from the temporary winding core, and the remaining length corresponding to "+α" need only be cut off. From the viewpoint of reducing a portion to be cut off and discarded, the α is preferably 20 μm or less.

A specific aspect of the heat treatment performed in a state where the magnetic tape is wound around the core member as described above will be described below.

An atmosphere temperature at which the heat treatment is performed (hereinafter, referred to as a "heat treatment temperature") is preferably 40° C. or higher, and more preferably 50° C. or higher. On the other hand, from the viewpoint of suppressing excessive deformation, the heat treatment temperature is preferably 75° C. or lower, more preferably 70° C. or lower, and still more preferably 65° C. or lower.

A weight-basis absolute humidity of an atmosphere in which the heat treatment is performed is preferably 0.1 g/kg Dry air or more, and more preferably 1 g/kg Dry air or more. An atmosphere having a weight-basis absolute humidity in the above range is preferable because it can be prepared without using a special device for reducing moisture. On the other hand, the weight-basis absolute humidity is preferably 70 g/kg Dry air or less, and more preferably 66 g/kg Dry air or less, from the viewpoint of suppressing occurrence of dew condensation and deterioration of workability. A heat treatment time is preferably 0.3 hours or more, and more preferably 0.5 hours or more. In addition, the heat treatment time is preferably 48 hours or less, from the viewpoint of production efficiency.

Formation of Servo Pattern

The magnetic recording medium can be a tape-shaped magnetic recording medium (that is, magnetic tape), and can also be a disk-shaped magnetic recording medium (that is, magnetic disk). In any aspect, the magnetic layer can have a servo pattern. The term "formation of servo pattern" can also be referred to as "recording of servo signal". Hereinafter, the formation of the servo patterns will be described using a magnetic tape as an example.

The servo pattern is usually formed along a longitudinal direction of the magnetic tape. Examples of control (servo control) systems using a servo signal include a timing-based servo (TBS), an amplitude servo, and a frequency servo.

As shown in European Computer Manufacturers Association (ECMA)-319 (June 2001), a timing-based servo system is adopted in a magnetic tape based on a linear-tape-open (LTO) standard (generally referred to as an "LTO tape"). In this timing-based servo system, the servo pattern is formed by continuously disposing a plurality of pairs of non-parallel magnetic stripes (also referred to as "servo stripes") in the longitudinal direction of the magnetic tape. In the present invention and the present specification, the term "timing-based servo pattern" refers to a servo pattern that enables head tracking in a timing-based servo system. As described above, the reason why the servo pattern is formed of a pair of non-parallel magnetic stripes is to indicate, to a servo signal reading element passing over the servo pattern, a passing position thereof. Specifically, the pair of magnetic stripes is formed such that an interval thereof continuously changes along a width direction of the magnetic tape, and the servo signal reading element reads the interval to thereby sense a relative position between the servo pattern and the servo signal reading element. Information on this relative position enables tracking on a data track. Accordingly, a plurality of servo tracks are usually set on the servo pattern along the width direction of the magnetic tape.

A servo band is formed of a servo pattern continuous in the longitudinal direction of the magnetic tape. A plurality of the servo bands are usually provided on the magnetic tape. For example, in an LTO tape, the number of the servo bands is five. Regions interposed between two adjacent servo bands are data bands. The data band is formed of a plurality of data tracks and each data track corresponds to each servo track.

Further, in one aspect, as shown in JP2004-318983A, information indicating a servo band number (referred to as "servo band identification (ID)" or "unique data band identification method (UDIM) information") is embedded in each servo band. This servo band ID is recorded by shifting a specific one of the plurality of pairs of the servo stripes in the servo band so that positions thereof are relatively displaced in the longitudinal direction of the magnetic tape. Specifically, a way of shifting the specific one of the plurality of pairs of servo stripes is changed for each servo band. Accordingly, the recorded servo band ID is unique for each servo band, and thus, the servo band can be uniquely specified only by reading one servo band with a servo signal reading element.

As a method for uniquely specifying the servo band, there is a method using a staggered method as shown in ECMA-319 (June 2001). In this staggered method, a group of pairs of non-parallel magnetic stripes (servo stripes) disposed continuously in plural in a longitudinal direction of the magnetic tape is recorded so as to be shifted in a longitudinal direction of the magnetic tape for each servo band. Since this combination of shifting methods between adjacent servo bands is unique throughout the magnetic tape, it is possible to uniquely specify a servo band in a case of reading a servo pattern with two servo signal reading elements.

As shown in ECMA-319 (June 2001), information indicating a position of the magnetic tape in the longitudinal direction (also referred to as "longitudinal position (LPOS) information") is usually embedded in each servo band. This LPOS information is also recorded by shifting the positions of the pair of servo stripes in the longitudinal direction of the magnetic tape, as the UDIM information. Note that, unlike the UDIM information, in this LPOS information, the same signal is recorded in each servo band.

It is also possible to embed, in the servo band, the other information different from the above UDIM information and LPOS information. In this case, the embedded information may be different for each servo band as the UDIM information or may be common to all servo bands as the LPOS information.

As a method of embedding the information in the servo band, a method other than the method described above can be adopted. For example, a predetermined code may be recorded by thinning out a predetermined pair from the group of pairs of servo stripes.

A head for forming a servo pattern is called a servo write head. The servo write head usually has a pair of gaps corresponding to the pair of magnetic stripes as many as the number of servo bands. Usually, a core and a coil are connected to each pair of gaps, and by supplying a current pulse to the coil, a magnetic field generated in the core can cause generation of a leakage magnetic field in the pair of gaps. In a case of forming the servo pattern, by inputting a current pulse while running the magnetic tape on the servo write head, the magnetic pattern corresponding to the pair of gaps is transferred to the magnetic tape to form the servo pattern. A width of each gap can be appropriately set according to a density of the servo pattern to be formed. The width of each gap can be set to, for example, 1 μm or less, 1 to 10 m, 10 μm or more, and the like.

Before the servo pattern is formed on the magnetic tape, the magnetic tape is usually subjected to a demagnetization (erasing) treatment. This erasing treatment can be performed by applying a uniform magnetic field to the magnetic tape using a direct current magnet or an alternating current magnet. The erasing treatment includes direct current (DC) erasing and alternating current (AC) erasing. The AC erasing is performed by gradually decreasing an intensity of the magnetic field while reversing a direction of the magnetic field applied to the magnetic tape. Meanwhile, the DC erasing is performed by applying a unidirectional magnetic field to the magnetic tape. The DC erasing further includes two methods. A first method is horizontal DC erasing of applying a unidirectional magnetic field along a longitudinal direction of the magnetic tape. A second method is vertical DC erasing of applying a unidirectional magnetic field along a thickness direction of the magnetic tape. The erasing treatment may be performed on the entire magnetic tape or may be performed for each servo band of the magnetic tape.

A direction of the magnetic field of the servo pattern to be formed is determined according to a direction of the erasing. For example, in a case where the horizontal DC erasing is performed to the magnetic tape, the servo pattern is formed so that the direction of the magnetic field is opposite to the direction of the erasing. Therefore, an output of a servo signal obtained by reading the servo pattern can be increased. As shown in JP2012-53940A, in a case where the magnetic pattern is transferred to, using the gap, a magnetic tape that has been subjected to the vertical DC erasing, a servo signal obtained by reading the formed servo pattern has a monopolar pulse shape. Meanwhile, in a case where a magnetic pattern is transferred to, using the gap, a magnetic tape that has been subjected to horizontal DC erasing, a servo signal obtained by reading the formed servo pattern has a bipolar pulse shape.

In one aspect, the dimension in the width direction of the magnetic tape can be controlled by acquiring dimension information in the width direction of the magnetic tape during running by using the servo signal and adjusting and changing the tension applied in the longitudinal direction of the magnetic tape according to the acquired dimension information. Such tension adjustment can contribute to suppressing a phenomenon that, during recording or reproduction, the magnetic head for recording or reproducing data deviates from a target track position due to width deformation of the magnetic tape and data is recorded or reproduced.

Magnetic Tape Cartridge

In one aspect, the magnetic recording medium may be a magnetic tape. Another aspect of the present invention relates to a magnetic tape cartridge comprising the magnetic tape.

Details of the magnetic tape included in the magnetic tape cartridge are as described above.

In the magnetic tape cartridge, generally, the magnetic tape is accommodated inside a cartridge body in a state of being wound around a reel. The reel is rotatably provided inside the cartridge body. As the magnetic tape cartridge, a single reel type magnetic tape cartridge having one reel inside the cartridge body and a dual reel type magnetic tape cartridge having two reels inside the cartridge body are widely used. In a case where the single reel type magnetic tape cartridge is mounted on a magnetic tape device for recording and/or reproducing data on the magnetic tape, the magnetic tape is pulled out of the magnetic tape cartridge to be wound around the reel on the magnetic tape device side.

A magnetic head is disposed on a magnetic tape transportation path from the magnetic tape cartridge to a winding reel. Feeding and winding of the magnetic tape are performed between a reel (supply reel) on the magnetic tape cartridge side and a reel (winding reel) on the magnetic tape device side. For example, data is recorded and/or reproduced as the magnetic head and the magnetic layer surface of the magnetic tape come into contact with each other to be slid on each other in the meantime. With respect to this, in the dual reel type magnetic tape cartridge, both reels of the supply reel and the winding reel are provided in the magnetic tape cartridge.

Magnetic Recording and Reproducing Device

Another aspect of the present invention relates to a magnetic recording and reproducing device including the magnetic recording medium. In one aspect, in the magnetic recording and reproducing device, recording of data on the magnetic recording medium and/or reproducing of data recorded on the magnetic recording medium can be performed as the magnetic layer surface of the magnetic recording medium and the magnetic head come into contact with each other to be slid on each other. The magnetic recording and reproducing device according to such an aspect is generally called a sliding type drive or a contact sliding type drive.

In the present invention and the present specification, the term "magnetic recording and reproducing device" means a device capable of performing at least one of the recording of data on the magnetic recording medium or the reproducing of data recorded on the magnetic recording medium. Such a device is generally called a drive. The magnetic head included in the magnetic recording and reproducing device can be a recording head capable of performing the recording of data on the magnetic recording medium, or can be a reproducing head capable of performing the reproducing of data recorded on the magnetic recording medium. In addition, in one aspect, the magnetic recording and reproducing device can include both a recording head and a reproducing head as separate magnetic heads. In another aspect, the magnetic head included in the magnetic tape device may have a configuration in which both a recording element and a reproducing element are provided in one magnetic head. As the reproducing head, a magnetic head (MR head) including a magnetoresistive (MR) element capable of sensitively reading information recorded on the magnetic recording medium as a reproducing element is preferable. As the MR head, various well-known MR heads (for example, a giant magnetoresistive (GMR) head and a tunnel magnetoresistive (TMR) head) can be used. In addition, the magnetic head which performs the recording of data and/or the reproducing of data may include a servo signal reading element. Alternatively, as a head other than the magnetic head which performs the recording of data and/or the reproducing of data, a magnetic head (servo head) comprising a servo signal reading element may be included in the magnetic tape device. For example, a magnetic head that records data and/or reproduces recorded data (hereinafter also referred to as "recording and reproducing head") can include two servo signal reading elements, and the two servo signal reading elements can simultaneously read two adjacent servo bands with the data band interposed therebetween. One or a plurality of elements for data can be disposed between the two servo signal reading elements. An element for recording data (recording element) and an element for reproducing data (reproducing element) are collectively referred to as an "element for data".

In a case of recording data and/or reproducing recorded data, first, tracking using the servo signal can be performed. That is, by causing the servo signal reading element to follow a predetermined servo track, the element for data can be controlled to pass on the target data track. Displacement of the data track is performed by changing a servo track read by the servo signal reading element in a tape width direction.

The recording and reproducing head can also perform recording and/or reproduction with respect to other data bands. In this case, the servo signal reading element need only be displaced to a predetermined servo band using the above described UDIM information to start tracking for the servo band.

Figure 2:
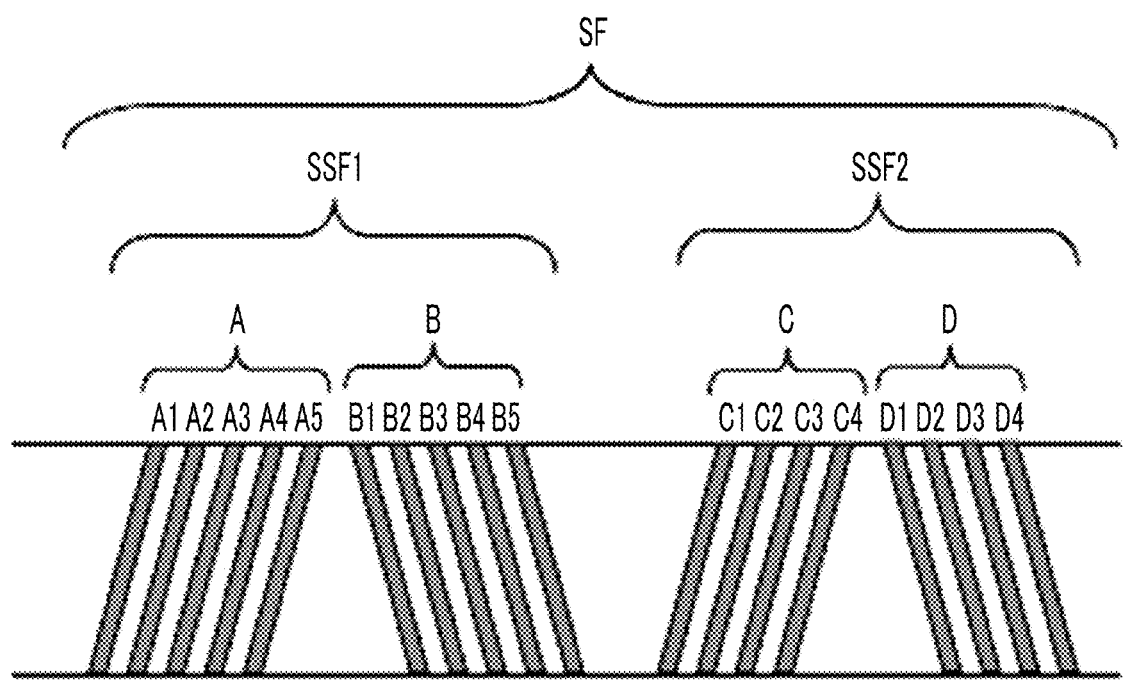
FIG. 2 shows an arrangement example of a servo pattern of a linear tape-open (LTO) Ultrium format tape.

FIG. 1 shows an arrangement example of the data band and the servo band. In FIG. 1, in the magnetic layer of a magnetic tape MT, a plurality of servo bands 1 are arranged so as to be interposed between guide bands 3. A plurality of regions 2 interposed between two servo bands are data bands. The servo pattern is a magnetization region, and is formed by magnetizing a specific region of the magnetic layer by the servo write head. A region magnetized by the servo write head (a position where the servo pattern is formed) is determined by the standard. For example, in an LTO Ultrium format tape which is based on a local standard, a plurality of servo patterns inclined with respect to a tape width direction as shown in FIG. 2 are formed on a servo band, in a case of manufacturing a magnetic tape. Specifically, in FIG. 2, a servo frame SF on the servo band 1 is composed of a servo sub-frame 1 (SSF1) and a servo sub-frame 2 (SSF2). The servo sub-frame 1 is composed of an A burst (in FIG. 2, reference numeral A) and a B burst (in FIG. 2, reference numeral B). The A burst is composed of servo patterns A1 to A5 and the B burst is composed of servo patterns B1 to B5. Meanwhile, the servo sub-frame 2 is composed of a C burst (in FIG. 2, reference numeral C) and a D burst (in FIG. 2, reference numeral D). The C burst is composed of servo patterns C1 to C4 and the D burst is composed of servo patterns D1 to D4. Such 18 servo patterns are arranged in the sub-frames in an array of 5, 5, 4, 4, as the sets of 5 servo patterns and 4 servo patterns, and are used for identifying the servo frames. FIG. 2 shows one servo frame for description. Note that, in practice, a plurality of the servo frames are arranged in the running direction in each servo band in the magnetic layer of the magnetic tape on which the head tracking of the timing-based servo system is performed. In FIG. 2, an arrow shows a running direction. For example, an LTO Ultrium format tape usually has 5000 or more servo frames per 1 μm of tape length in each servo band of the magnetic layer.

In the magnetic recording and reproducing device, in one aspect, the magnetic recording medium is treated as a removable medium (so-called replaceable medium), and, for example, a magnetic tape cartridge accommodating the magnetic tape therein is inserted into the magnetic recording and reproducing device and taken out. In another aspect, the magnetic recording medium is not treated as a replaceable medium, for example, the magnetic tape is wound around the reel of the magnetic recording and reproducing device comprising a magnetic head, and the magnetic tape is accommodated in the magnetic recording and reproducing device. In one aspect, in such a magnetic recording and reproducing device, the magnetic tape and the magnetic head can be accommodated in a sealed space in the magnetic tape apparatus. In the present invention and the present specification, the term "sealed space" refers to a space in which a degree of sealing evaluated by a dipping method (bombing method) using helium (He) specified in JIS Z 2331:2006 helium leakage test method is 10×10$^{-8}$ Pa m$^3$/sec or less. The degree of sealing of the sealed space may be, for example, 5×10$^{-9}$ Pa m$^3$/sec or more and 10×10$^{-8}$ Pa m$^3$/sec or less, or may be less than the above range. In one aspect, the entire space in a housing can be the sealed space, and in another aspect, a part of the space in a housing can be the sealed space. The sealed space can be an internal space of the housing that covers the whole or a part of the magnetic tape device. The material and shape of the housing are not particularly limited, and can be, for example, the same as the material and shape of the housing of a normal magnetic tape device. As an example, metal, resin, or the like can be used as the material of the housing.

EXAMPLES

Hereinafter, one aspect of the present invention will be described based on Examples. Note that the present invention is not limited to the embodiments shown in Examples. "Parts" and "%" in the following description mean "parts by mass" and "mass %", unless otherwise specified. "eq" indicates equivalent and is a unit not convertible into SI unit.

The following various steps and operations were performed in an environment of a temperature of 20° C. to 25° C. and a relative humidity of 40% to 60%, unless otherwise noted.

Abrasive

The average primary particle diameters of the various abrasives in Table 1 are values obtained by performing, by the method described above, scale correction using a circle having a diameter of 1 cm in a case of incorporating an image from a scanner and performing image analysis to calculate the equivalent circle diameter using a transmission electron microscope H-9000 manufactured by Hitachi, Ltd. as a transmission electron microscope and image analysis software KS-400 manufactured by Carl Zeiss as image analysis software at an imaging magnification of about 50,000 to 100,000×.

Ferromagnetic Powder

In Table 1, "BaFe" indicates hexagonal barium ferrite powder having an average particle size (average plate diameter) of 21 nm.

In Table 1, "SrFe" indicates a hexagonal strontium ferrite powder produced by the method described below, and "ε-iron oxide" indicates an ε-iron oxide powder produced by the method described below.

The average particle volume of the various ferromagnetic powders described below is a value obtained by the method described above. The various values related to the particle size of the various powders described below are also values obtained by the method described above.

The anisotropy constant Ku is a value obtained by the method described above regarding each ferromagnetic powder by using a vibrating sample magnetometer (manufactured by Toei Industry Co., Ltd.).

A mass magnetization σs is a value measured at a magnetic field intensity of 15 kOe using a vibrating sample magnetometer (manufactured by Toei Industry Co., Ltd.).

Method for Producing Ferromagnetic Powder

Method for Producing Hexagonal Strontium Ferrite Powder 1707 g of SrCO$_3$, 687 g of H$_3$BO$_3$, 1120 g of Fe$_2$O$_3$, 45 g of Al(OH)$_3$, 24 g of BaCO$_3$, 13 g of CaCO$_3$, and 235 g of Nd$_2$O$_3$ were weighed and mixed by a mixer to obtain a raw material mixture.

The obtained raw material mixture was melted in a platinum crucible at a melting temperature of 1390° C., and a hot water outlet provided at a bottom of the platinum crucible was heated while stirring a melt, and the melt was discharged in a rod shape at about 6 g/sec. Hot water was rolled and quenched by a pair of water-cooling rollers to produce an amorphous body. 280 g of the produced amorphous body was charged into an electric furnace, was heated to 635° C. (crystallization temperature) at a temperature rising rate of 3.5° C./min, and was kept at the same temperature for 5 hours to precipitate (crystallize) hexagonal strontium ferrite particles.

Next, a crystallized product obtained above including hexagonal strontium ferrite particles was coarsely pulverized in a mortar, and 1000 g of zirconia beads having a particle diameter of 1 mm and 800 ml of an acetic acid aqueous solution of 1% concentration were added to the crystallized product in a glass bottle, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving treatment of a glass component, and then the crystallized product was sedimented by a centrifugal separator to be washed by repeatedly performing decantation and was dried in a heating furnace at an in-furnace temperature of 110° C. for 6 hours to obtain a hexagonal strontium ferrite powder.

Regarding the hexagonal strontium ferrite powder ("SrFe" in Table 1 below) obtained as described above, an average particle volume was 900 nm$^3$, an anisotropy constant Ku was 2.2×10$^5$ J/m$^3$, and a mass magnetization σs was 49 A·m$^2$/kg.

12 mg of a sample powder was collected from the hexagonal strontium ferrite powder obtained above, elemental analysis of the filtrated solution obtained by partially dissolving this sample powder under dissolution conditions illustrated above was performed by an ICP analyzer, and a surface layer portion content of a neodymium atom was determined.

Separately, 12 mg of a sample powder was collected from the hexagonal strontium ferrite powder obtained above, elemental analysis of the filtrated solution obtained by totally dissolving this sample powder under dissolution conditions illustrated above was performed by an ICP analyzer, and a bulk content of a neodymium atom was obtained.

A content (bulk content) of a neodymium atom with respect to 100 atom % of an iron atom in the hexagonal strontium ferrite powder obtained above was 2.9 atom %. A surface layer portion content of a neodymium atom was 8.0 atom %. It was confirmed that a ratio between a surface layer portion content and a bulk content, that is, "surface layer portion content/bulk content" was 2.8, and a neodymium atom was unevenly distributed in a surface layer of a particle.

The fact that the powder obtained above shows a crystal structure of hexagonal ferrite was confirmed by performing scanning with CuKα rays under conditions of a voltage of 45 kV and an intensity of 40 mA and measuring an X-ray diffraction pattern under the following conditions (X-ray diffraction analysis). The powder obtained above showed a crystal structure of hexagonal ferrite of a magnetoplumbite type (M type). A crystal phase detected by X-ray diffraction analysis was a single phase of a magnetoplumbite type.

PANalytical X'Pert Pro diffractometer, PIXcel detector
Soller slit of incident beam and diffraction beam: 0.017 radians
Fixed angle of dispersion slit: 1/4 degrees
Mask: 10 mm Anti-scattering slit: 1/4 degrees
Measurement mode: continuous
Measurement time per stage: 3 seconds
Measurement speed: 0.017 degrees per second
Measurement step: 0.05 degrees Method for Producing ε-Iron Oxide Powder 8.3 g of iron(III) nitrate nonahydrate, 1.3 g of gallium(III) nitrate octahydrate, 190 mg of cobalt(II) nitrate hexahydrate, 150 mg of titanium(IV) sulfate, and 1.5 g of polyvinylpyrrolidone (PVP) were dissolved in 90 g of pure water, and while the dissolved product was stirred using a magnetic stirrer, 4.0 g of an aqueous ammonia solution having a concentration of 25% was added to the dissolved product under a condition of an atmosphere temperature of 25° C. in an air atmosphere, and the dissolved product was stirred for 2 hours while maintaining a temperature condition of the atmosphere temperature of 25° C. A citric acid solution obtained by dissolving 1 g of citric acid in 9 g of pure water was added to the obtained solution, and the mixture was stirred for 1 hour. The powder sedimented after stirring was collected by centrifugal separation, was washed with pure water, and was dried in a heating furnace at an in-furnace temperature of 80° C.

800 g of pure water was added to the dried powder, and the powder was dispersed again in water to obtain dispersion liquid. The obtained dispersion liquid was heated to a liquid temperature of 50° C., and 40 g of an aqueous ammonia solution having a concentration of 25% was dropwise added with stirring. After stirring for 1 hour while maintaining the temperature at 50° C., 14 mL of tetraethoxysilane (TEOS) was dropwise added and was stirred for 24 hours. A powder sedimented by adding 50 g of ammonium sulfate to the obtained reaction solution was collected by centrifugal separation, was washed with pure water, and was dried in a heating furnace at an in-furnace temperature of 80° C. for 24 hours to obtain a ferromagnetic powder precursor.

The obtained ferromagnetic powder precursor was loaded into a heating furnace at an in-furnace temperature of 1000° C. in an air atmosphere and was heat-treated for 4 hours.

The heat-treated ferromagnetic powder precursor was put into an aqueous solution of 4 mol/L sodium hydroxide (NaOH), and the liquid temperature was maintained at 70° C. and was stirred for 24 hours, whereby a silicic acid compound as an impurity was removed from the heat-treated ferromagnetic powder precursor.

Thereafter, the ferromagnetic powder from which the silicic acid compound was removed was collected by centrifugal separation, and was washed with pure water to obtain a ferromagnetic powder.

The composition of the obtained ferromagnetic powder that was confirmed by high-frequency inductively coupled plasma-optical emission spectrometry (ICP-OES) has Ga, Co, and a Ti substitution type ε-iron oxide (ε-$Ga_{0.28}Co_{0.05}Ti_{0.05}Fe_{1.62}O_3$). In addition, X-ray diffraction analysis was performed under the same condition as that described above for the production method of hexagonal strontium ferrite powder, and from a peak of an X-ray diffraction pattern, it was confirmed that the obtained ferromagnetic powder does not include α-phase and γ-phase crystal structures, and has a single-phase and ε-phase crystal structure (ε-iron oxide crystal structure).

Regarding the obtained ε-iron oxide powder ("ε-iron oxide" in Table 1 below), an average particle volume was 750 nm$^3$, an anisotropy constant Ku was 1.2×10$^5$ J/m$^3$, and a mass magnetization σs was 16 A·m$^2$/kg.

Example 1

(1) Preparation of Abrasive Dispersion Liquid 3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a polyester polyurethane resin having a SO$_3$Na group as a polar group (UR-4800 manufactured by Toyobo Co., Ltd. (amount of a polar group: 80 meq/kg)), and 570.0 parts of a mixed solvent of methyl ethyl ketone and cyclohexanone at 1:1 (mass ratio) as a solvent were mixed with respect to 100.0 parts of the abrasive shown in Table 1, and dispersed in the presence of zirconia beads by a paint shaker for 5 hours. After the dispersion, the dispersion liquid and the beads were separated by a mesh and an abrasive dispersion liquid was obtained.

A beaker containing the abrasive dispersion liquid was left in an oven having an internal atmosphere temperature of 60° C. and heated to volatilize the solvent in the abrasive dispersion liquid, thereby concentrating the abrasive dispersion liquid. In Example 1, heating was performed until the mass of the abrasive dispersion liquid reached 30% of the mass before the heating ("concentration rate" in Table 1).

In this way, an abrasive dispersion liquid used for preparing the magnetic layer forming composition was obtained.

(2) Formulation of Magnetic Layer Forming Composition

Magnetic Liquid

Ferromagnetic powder (Type: see Table 1) 100.0 parts

SO$_3$Na group-containing polyurethane resin 14.0 parts
    Weight-average molecular weight: 70,000, SO$_3$Na group: 0.2 meq/g Cyclohexanone 150.0 parts Methyl ethyl ketone 150.0 parts Abrasive Solution Abrasive dispersion liquid prepared in (1) above 6.0 parts Protrusion Forming Agent Liquid Protrusion forming agent 2.0 parts
    Type: colloidal silica (average particle size: 120 nm)

Methyl ethyl ketone 1.4 parts

Other Components

Stearic acid 2.0 parts

Stearic acid amide 0.2 parts

Butyl stearate 2.0 parts

Polyisocyanate (CORONATE (registered trademark) L manufactured by Tosoh Corporation) 2.5 parts Finishing Additive Solvent Cyclohexanone 200.0 parts Methyl ethyl ketone 200.0 parts (3) Formulation of Non-Magnetic Layer Forming Composition Non-magnetic inorganic powder α-iron oxide 100.0 parts
    Average particle size (average long axis length): 0.15 μm
    Acicular ratio: 7.0
    Brunauer-Emmett-Teller (BET) specific surface area: 52 m$^2$/g Carbon black 20.0 parts
    Average particle size: 20 nm SO$_3$Na group-containing polyurethane resin 18.0 parts
    Weight-average molecular weight: 70,000, SO$_3$Na group: 0.2 meq/g Stearic acid 2.0 parts Stearic acid amide 0.2 parts Butyl stearate 2.0 parts Cyclohexanone 300.0 parts Methyl ethyl ketone 300.0 parts (4) Formulation of Back Coating Layer Forming Composition Carbon black 100.0 parts
  Dibutyl phthalate (DBP) oil absorption amount: 74 cm$^3$/100 g
Nitrocellulose 27.0 parts
Polyester polyurethane resin containing sulfonic acid group and/or salt thereof
  62.0 parts
Polyester resin 4.0 parts
Alumina powder (BET specific surface area: 17 m$^2$/g) 0.6 parts
Methyl ethyl ketone 600.0 parts
Toluene 600.0 parts
Polyisocyanate (CORONATE (registered trademark) L manufactured by Tosoh Corporation) 15.0 parts (5) Preparation of Each Layer Forming Composition The magnetic layer forming composition was prepared by the following method. The above magnetic liquid was prepared by dispersing the above components for 24 hours (beads-dispersion) using a batch type vertical sand mill. As dispersion beads, zirconia beads having a bead diameter of 0.5 mm were used. Using the sand mill, the prepared magnetic liquid was mixed with the abrasive solution, and other components (protrusion forming agent liquid, other components, and finishing additive solvent) and the mixture was beads-dispersed for 5 minutes, and then the treatment (ultrasonic dispersion) was performed on the mixture for 0.5 minutes by a batch type ultrasonic apparatus (20 kHz, 300 W). Thereafter, filtration was performed using a filter having a pore diameter of 0.5 μm to prepare a magnetic layer forming composition.

A non-magnetic layer forming composition was prepared by the following method. The components described above excluding the lubricant (stearic acid, stearic acid amide, and butyl stearate) were kneaded and diluted by an open kneader, and subjected to a dispersion treatment by a horizontal beads mill dispersing device. After that, the lubricant (stearic acid, stearic acid amide, and butyl stearate) was added into the obtained dispersion liquid and stirred and mixed by a dissolver stirrer to prepare a non-magnetic layer forming composition.

A back coating layer forming composition was prepared by the following method. The above components excluding polyisocyanate were introduced into a dissolver stirrer, stirred at a circumferential speed of 10 m/sec for 30 minutes, and then subjected to a dispersion treatment by a horizontal beads mill dispersing device. After that, polyisocyanate was added, and stirred and mixed by a dissolver stirrer, and a back coating layer forming composition was prepared.

(6) Production of Magnetic Tape and Magnetic Tape Cartridge

The non-magnetic layer forming composition prepared in the above (5) was applied onto a surface of a biaxially stretched support made of polyethylene terephthalate having a thickness of 4.1 μm so that the thickness after drying was as shown in Table 1 and was dried to form a non-magnetic layer. Next, the magnetic layer forming composition prepared in the above (5) was applied onto the non-magnetic layer so that the thickness after drying was 0.1 μm to form a coating layer. After that, while the coating layer of the magnetic layer forming composition is in an undried state, a vertical alignment treatment was performed by applying a magnetic field having a magnetic field intensity of 0.3 T in a direction perpendicular to a surface of the coating layer, and then the surface of the coating layer was dried. Thereby, a magnetic layer was formed. After that, the back coating layer forming composition prepared in the above (5) was applied onto a surface of the support opposite to the surface on which the non-magnetic layer and the magnetic layer are formed and was dried so that the thickness after drying was 0.3 μm, and thus, a back coating layer was formed.

After that, a surface smoothing treatment (calendering treatment) was performed using a calender roll formed of only metal rolls at a speed of 100 m/min, a linear pressure of 300 kg/cm, and a calender temperature of 90° C. (surface temperature of calender roll) (number of times of calendering: 2 times).

After that, a long magnetic tape original roll was stored in a heat treatment furnace having an atmosphere temperature of 70° C. to perform a heat treatment (heat treatment time: 36 hours). After the heat treatment, the resultant was slit to have ½ inches width to obtain a magnetic tape. A servo signal was recorded on the magnetic layer of the obtained magnetic tape by a commercially available servo writer to obtain a magnetic tape having a data band, a servo band, and a guide band in an arrangement according to a linear tape-open (LTO) Ultrium format and having a servo pattern (timing-based servo pattern) in an arrangement and a shape according to the LTO Ultrium format on the servo band. The servo pattern thus formed is a servo pattern according to the description in Japanese industrial standards (JIS) X6175: 2006 and Standard ECMA-319 (June 2001). The total number of servo bands is 5, and the total number of data bands is 4.

The magnetic tape (length of 970 m) after forming the servo pattern was wound around the winding core for heat treatment, and the heat treatment is performed while being wound around the winding core. As the winding core for heat treatment, a solid core member (outer diameter: 50 mm) formed of a resin and having the bending elastic modulus of 0.8 GPa was used, and the tension during winding was set as 0.6 N. The heat treatment was performed at a heat treatment temperature of 50° C. for 5 hours. The weight-basis absolute humidity in the atmosphere in which the heat treatment was performed was 10 g/kg Dry air.

After the heat treatment, the magnetic tape and the winding core for heat treatment were sufficiently cooled, the magnetic tape was removed from the winding core for heat treatment and wound around the temporary winding core, and then, the magnetic tape having the final product length (960 m) was wound around the reel (reel outer diameter: 44 mm) of the magnetic tape cartridge (LTO Ultrium 7 data cartridge) from the temporary winding core. The remaining length of 10 μm was cut out and the leader tape based on section 9 of Standard European Computer Manufacturers Association (ECMA)-319 (June 2001) Section 3 was bonded to the terminal of the cut side by using a commercially available splicing tape. As the temporary winding core, a solid core member made of the same material and having the same outer diameter as the winding core for heat treatment was used, and the tension during winding was set as 0.6 N.

Therefore, the magnetic tape cartridge of the Example 1 of the single reel type in which the magnetic tape having a length of 960 μm is wound on the reel is produced.

Examples 2, 3, and 6 to 10 and Comparative Examples 2 to 4

A magnetic tape cartridge was produced by the method described in Example 1 except that an abrasive shown in Table 1 was used as the abrasive.

Examples 4 and 5

A magnetic tape cartridge was produced by the method described in Example 1, except that the concentration rate shown in Table 1 was obtained by heating and concentrating the abrasive dispersion liquid.

Example 11

A magnetic tape cartridge was produced by the method described in Example 1, except that two non-magnetic layers were formed as below and the magnetic layer forming composition was applied onto the formed upper non-magnetic layer to form a magnetic layer, as described in Example 1, and that the number of times of calendering was set to one.

Formulation of Lower Non-Magnetic Layer Forming Composition
  Carbon black (average particle size: 20 nm) 100.0 parts
  Trioctylamine 4.0 parts
  Vinyl chloride resin 12.0 parts
  Stearic acid 1.5 parts
  Stearic acid amide 0.3 parts
  Butyl stearate 1.5 parts
  Cyclohexanone 200.0 parts
  Methyl ethyl ketone 510.0 parts Formulation of Upper Non-Magnetic Layer Forming Composition
  Non-magnetic inorganic powder α-iron oxide 100.0 parts
    Average particle size (average long axis length): 30 nm
    Average short axis length: 15 nm
    Acicular ratio: 2.0
  $SO_3Na$ group-containing polyurethane resin 18.0 parts
    Weight-average molecular weight: 70,000, $SO_3Na$ group: 0.2 meq/g
  Stearic acid 1.0 part
  Cyclohexanone 300.0 parts
  Methyl ethyl ketone 300.0 parts For each of the lower non-magnetic layer forming composition and the upper non-magnetic layer forming composition, each component was kneaded by an open kneader for 240 minutes and then dispersed by a sand mill. As the dispersion conditions of each non-magnetic layer forming composition, a dispersion time was 24 hours, and zirconia beads having a bead diameter of 0.1 mm were used as dispersion beads. 4.0 parts of polyisocyanate (CORONATE 3041 manufactured by Tosoh Corporation) were added to the dispersion liquid obtained, and the mixture was further stirred and mixed for 20 minutes, and then filtered using a filter having a pore diameter of 0.5 μm.

Based on the above, the lower non-magnetic layer forming composition and the upper non-magnetic layer forming composition were prepared.

The lower non-magnetic layer forming composition was applied onto a surface of a biaxial stretched support made of polyethylene terephthalate having a thickness of 4.1 μm so that the thickness after the drying becomes 0.25 m, and was dried in the environment of an atmosphere temperature of 100° C., to form a lower non-magnetic layer. The upper non-magnetic layer forming composition was applied onto the lower non-magnetic layer so that the thickness after drying becomes 0.25 m, and was dried in an environment of an atmosphere temperature of 100° C., to form an upper non-magnetic layer. In this way, a non-magnetic layer (total number of layers: 2 layers) with a total thickness of 0.5 μm was formed.

Examples 12 and 13

A magnetic tape cartridge was produced by the method described in Example 11, except that a ferromagnetic powder described in the "Ferromagnetic powder" column of Table 1 was used as the ferromagnetic powder.

Comparative Example 1

A magnetic tape cartridge was produced by the method described in Example 1, except that the abrasive dispersion liquid was not heated and concentrated.

For the examples and the comparative examples, two magnetic tape cartridges were produced, one used for obtaining the following abrasive aggregate ratio and the other used for evaluating the head wear and durability described below.

Evaluation Method

Abrasive Aggregate Ratio

The abrasive aggregate ratio was obtained by the method described above using S-4800 manufactured by Hitachi High-Tech Corporation was used as the FE-SEM and free software ImageJ as the image analysis software. For Example 1, the procedures and conditions described above were adopted using ImageJ to obtain the abrasive aggregate ratio. For other examples and comparative examples, the threshold setting of the binarization condition was adjusted according to the type of the abrasive.

Wear Evaluation (AlFeSil wear)

A wear width of an AlFeSil square bar after the magnetic tape taken out from each magnetic tape cartridge is run using a reel tester was measured. The AlFeSil square bar is a square bar made of AlFeSil, which is a Sendust-based alloy. For the evaluation, an AlFeSil square bar specified in European Computer Manufacturers Association (ECMA)-288/Annex H/H2 was used. The wear width of the AlFeSil square bar was obtained as an abrasion width described in a paragraph 0015 of JP2007-026564A, based on FIG. 1 of the same publication, by observing an edge of the AlFeSil square bar from above using an optical microscope. The running was performed under the following running conditions.

In an environment of a temperature of 23° C. and a relative humidity of 50%, the magnetic layer surface of the magnetic tape was brought into contact with one edge side of the AlFeSil square bar with a wrap angle of 120 and a tension applied in the longitudinal direction of the magnetic tape of 100 gf so as to be orthogonal to a longitudinal direction of the AlFeSil square bar. In this state, a portion of the magnetic tape over a length of 50 μm in the longitudinal direction was reciprocated 50 times at a speed of 3 m/sec. "gf" indicates a gram-force, and 1 N (Newton) is about 102 gf. The head wear was evaluated from the measured wear width of the AlFeSil square bar according to the following evaluation standard.

Evaluation Standard
  A: AlFeSil wear width was 10 μm or less
  B: AlFeSil wear width was more than 10 μm and 12 μm or less
  C: AlFeSil wear width was more than 12 μm and 15 μm or less
  D: AlFeSil wear width was more than 15 μm Durability (Tape Scraping)

After the measurement of the wear width of the AlFeSil square bar, the magnetic layer surface of each magnetic tape was observed by an optical microscope, and the durability (tape scraping) of the magnetic tape was evaluated from the observation results according to the following evaluation standard.

Evaluation Standard
- A: Neither scratches nor tape shavings were confirmed on magnetic layer surface.
- B: Slight scratches were confirmed on magnetic layer surface. Adhesion of tape shavings to magnetic layer surface was not confirmed.
- C: Slight scratches were confirmed on magnetic layer surface. Further, slight adhesion of tape shavings to magnetic layer surface was confirmed.
- D: Scratches more severe than those confirmed in B and C were confirmed on magnetic layer surface. Further, adhesion of large amount of tape shavings to magnetic layer surface was confirmed.

The above results are shown in Table 1.

TABLE 1

| | Ferromagnetic powder | Abrasive type | Abrasive average primary particle diameter | Lower non-magnetic layer non-magnetic powder | Lower non-magnetic layer thickness | Upper non-magnetic layer non-magnetic powder | Upper non-magnetic layer thickness | Abrasive dispersion heating and concentrating concentration rate | Abrasive aggregate ratio (%) | Wear evaluation (AlFeSil wear) | Durability evaluation (Tape scraping) |
|---|---|---|---|---|---|---|---|---|---|---|---|
| Example 1 | BaFe | TiC | 50 nm | Carbon black/α-iron oxide | 0.7 μm | - | - | 30% | 83% | A | A |
| Example 2 | BaFe | TiC | 100 nm | Carbon black/α-iron oxide | 0.7 μm | - | - | 30% | 89% | A | A |
| Example 3 | BaFe | TiC | 20 nm | Carbon black/α-iron oxide | 0.7 μm | - | - | 30% | 91% | A | A |
| Example 4 | BaFe | TiC | 50 nm | Carbon black/α-iron oxide | 0.7 μm | - | - | 50% | 73% | B | B |
| Example 5 | BaFe | TiC | 50 nm | Carbon black/α-iron oxide | 0.7 μm | - | - | 70% | 53% | C | C |
| Example 6 | BaFe | WC | 50 nm | Carbon black/α-iron oxide | 0.7 μm | - | - | 30% | 84% | A | A |
| Example 7 | BaFe | ZrC | 50 nm | Carbon black/α-iron oxide | 0.7 μm | - | - | 30% | 87% | A | A |
| Example 3 | BaFe | SiC | 50 nm | Carbon black/α-iron oxide | 0.7 μm | - | - | 30% | 85% | A | A |
| Example 9 | BaFe | $B_4C$ | 50 nm | Carbon black/α-iron oxide | 0.7 μm | - | - | 30% | 94% | A | A |
| Example 10 | BaFe | VC | 50 nm | Carbon black/α-iron oxide | 0.7 μm | - | - | 30% | 93% | A | A |
| Example 11 | BaFe | TiC | 50 nm | Carbon black | 0.25 μm | α-iron oxide | 0.25 μm | 30% | 93% | A | B |
| Example 12 | SrFe | TiC | 50 nm | Carbon black | 0.25 μm | α-iron oxide | 0.25 μm | 30% | 82% | A | B |
| Example 13 | ε-iron oxide | TiC | 50 nm | Carbon black | 0.25 μm | α-iron oxide | 0.25 μm | 30% | 86% | A | B |
| Comparative Example 1 | BaFe | TiC | 50 nm | Carbon black/α-iron oxide | 0.7 μm | - | - | No heating and concentrating | 21% | D | D |
| Comparative Example 2 | BaFe | Diamond | 50 nm | Carbon black/α-iron oxide | 0.7 μm | - | - | 30% | 83% | D | B |
| Comparative Example 3 | BaFe | Alumina | 50 nm | Carbon black/α-iron oxide | 0.7 μm | - | - | 30% | 89% | D | D |
| Comparative Example 4 | BaFe | Zirconia | 50 nm | Carbon black/α-iron oxide | 0.7 μm | - | - | 30% | 86% | B | D |

From the results shown in Table 1, it can be confirmed that the magnetic tape of Examples 1 to 13 having a magnetic layer in which the carbide abrasive having an average primary particle diameter in the range described above is present in an abrasive aggregate ratio of 50% or more can achieve both the excellent durability and reduction of wear of the AlFeSil square bar. The present inventor speculates that this is because, as described above, the presence of the carbide abrasive in the magnetic layer in the above-described state contributed to alleviation of the impact on the magnetic layer surface during sliding on the AlFeSil square bar. Such a magnetic tape can exhibit excellent durability and can reduce head wear.

One aspect of the present invention is useful in the technical field of a data storage magnetic recording medium.

What is claimed is:

1. A magnetic recording medium comprising:
    a non-magnetic support; and
    a magnetic layer containing a ferromagnetic powder,
    wherein the magnetic layer includes an abrasive,
    the abrasive is a carbide, the carbide is one or more selected from the group consisting of titanium carbide, tungsten carbide, zirconium carbide, silicon carbide, boron carbide, and vanadium carbide; and
    an average primary particle diameter of the abrasive is 10 nm or more and 90 nm or less, and
    in an electron microscope image of a surface of the magnetic layer, assuming that a total area occupied by the abrasive is 100%, a ratio of an area occupied by the abrasive present in an aggregated state having a maximum Feret diameter of 0.2 μm or more is 73% or more.

2. The magnetic recording medium according to claim 1, further comprising:
    one or more layers of a non-magnetic layer containing a non-magnetic powder between the non-magnetic support and the magnetic layer.

3. The magnetic recording medium according to claim 2, wherein, in a case where a total number of layers of the non-magnetic layer is one, a thickness of the non-magnetic layer of one layer is less than 1.0 μm, and in a case where the total number of layers of the non-magnetic layer is two or more, a total thickness of the non-magnetic layer of two or more layers is less than 1.0 μm.

4. The magnetic recording medium according to claim 1, wherein the carbide is titanium carbide.

5. The magnetic recording medium according to claim 1, wherein the ratio of the area occupied by the abrasive present in the aggregated state having the maximum Feret diameter of 0.2 μm or more is 73% or more and 95% or less.

6. The magnetic recording medium according to claim 1, wherein the ratio of the area occupied by the abrasive present in the aggregated state having the maximum Feret diameter of 0.2 μm or more is 80% or more and 95% or less.

7. The magnetic recording medium according to claim 1, further comprising:
    a back coating layer containing a non-magnetic powder on a surface side of the non-magnetic support opposite to a surface side on which the magnetic layer is provided.

8. The magnetic recording medium according to claim 1, wherein the magnetic recording medium is a magnetic tape.

9. A magnetic tape cartridge comprising:
    the magnetic tape according to claim 8.

10. The magnetic tape cartridge according to claim 9, wherein the magnetic tape further comprises one or more layers of a non-magnetic layer containing a non-magnetic powder between the non-magnetic support and the magnetic layer.

11. The magnetic tape cartridge according to claim 10, wherein, in a case where a total number of layers of the non-magnetic layer is one, a thickness of the non-magnetic layer of one layer is less than 1.0 μm, and in a case where the total number of layers of the non-magnetic layer is two or more, a total thickness of the non-magnetic layer of two or more layers is less than 1.0 μm.

12. The magnetic tape cartridge according to claim 9, wherein the ratio of the area occupied by the abrasive present in the aggregated state having the maximum Feret diameter of 0.2 μm or more is 73% or more and 95% or less.

13. The magnetic tape cartridge according to claim 9, wherein the ratio of the area occupied by the abrasive present in the aggregated state having the maximum Feret diameter of 0.2 μm or more is 80% or more and 95% or less.

14. The magnetic tape cartridge according to claim 9, wherein the magnetic tape further comprises a back coating layer containing a non-magnetic powder on a surface side of the non-magnetic support opposite to a surface side on which the magnetic layer is provided.

15. A magnetic recording and reproducing device comprising:
    the magnetic recording medium according to claim 1.

* * * * *